Jan. 14, 1941.  A. RYSICK  2,228,931
RECORDING AND REPRODUCING MACHINE
Filed Oct. 28, 1938  26 Sheets-Sheet 3

INVENTOR.
ARNO RYSICK
BY
Richards & Geier
ATTORNEYS

Jan. 14, 1941. A. RYSICK 2,228,931
RECORDING AND REPRODUCING MACHINE
Filed Oct. 28, 1938 26 Sheets-Sheet 4

INVENTOR
ARNO RYSICK,
BY Richards & Geier
ATTORNEYS

Jan. 14, 1941. A. RYSICK 2,228,931
RECORDING AND REPRODUCING MACHINE
Filed Oct. 28, 1938 26 Sheets-Sheet 5
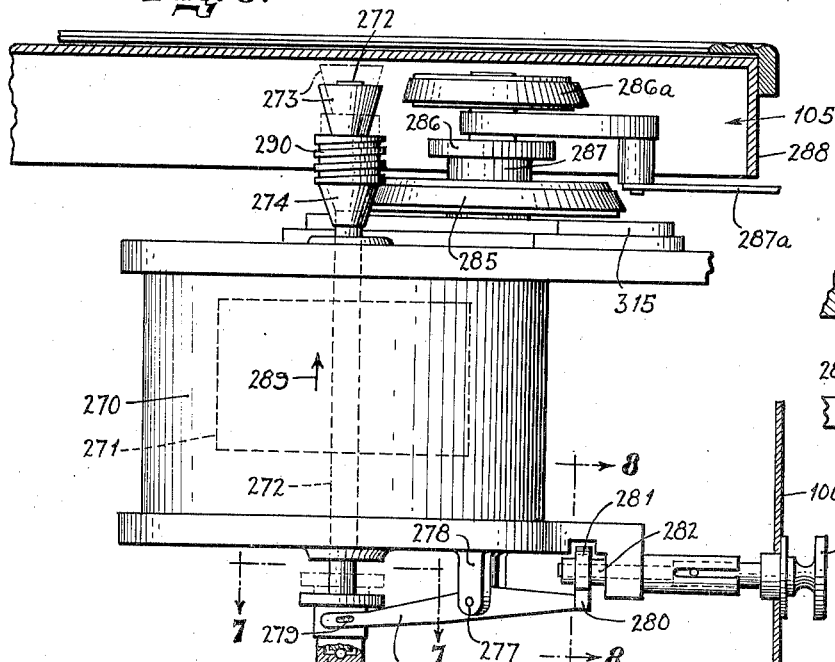
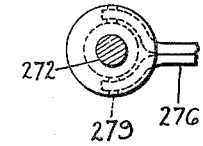
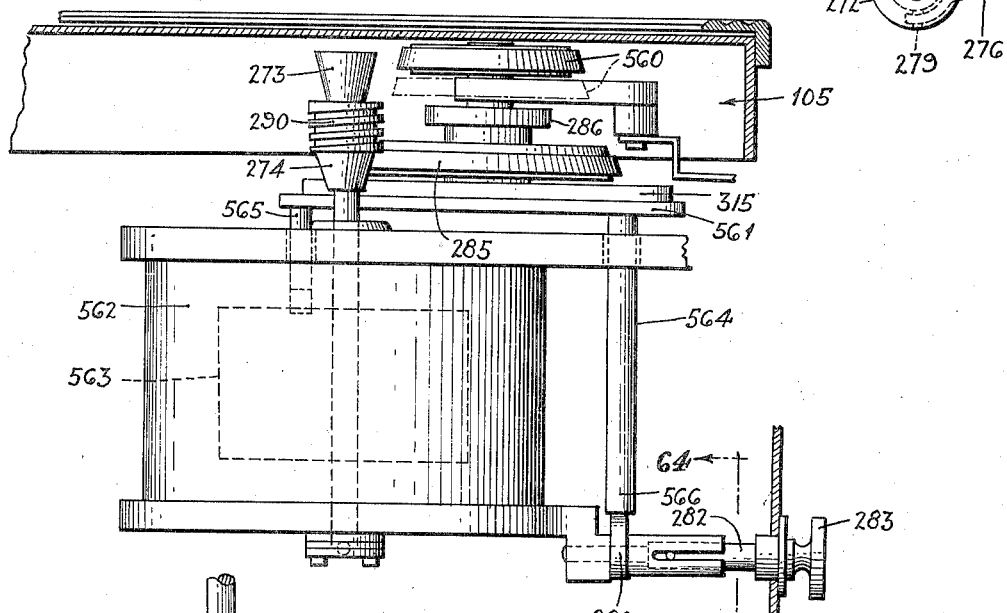
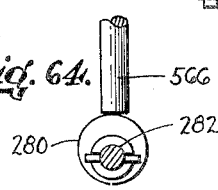
INVENTOR
ARNO RYSICK
BY
Richards & Geier
ATTORNEYS

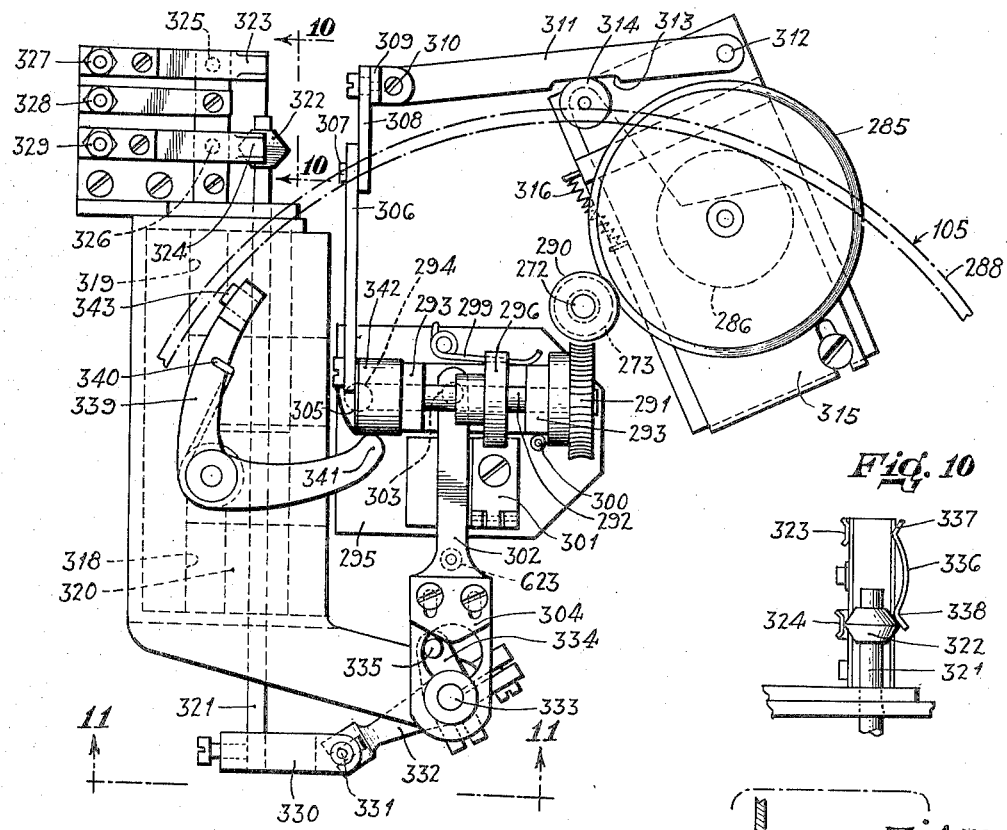
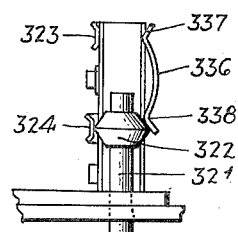
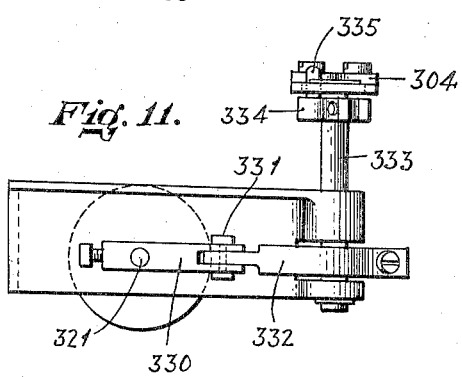
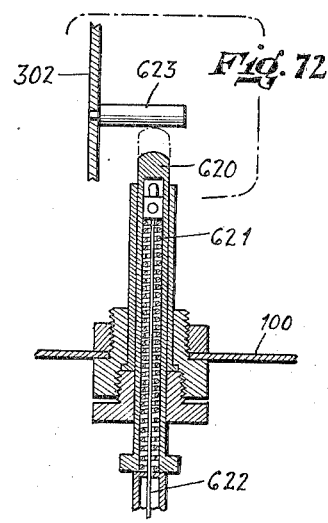

Jan. 14, 1941.　　　　A. RYSICK　　　　2,228,931
RECORDING AND REPRODUCING MACHINE
Filed Oct. 28, 1938　　　26 Sheets-Sheet 7

INVENTOR
ARNO RYSICK
BY
Richards & Geier
ATTORNEYS

Jan. 14, 1941.　　　　　A. RYSICK　　　　　2,228,931
RECORDING AND REPRODUCING MACHINE
Filed Oct. 28, 1938　　　　26 Sheets-Sheet 8
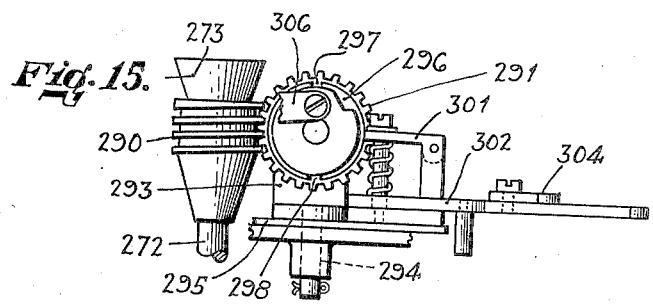
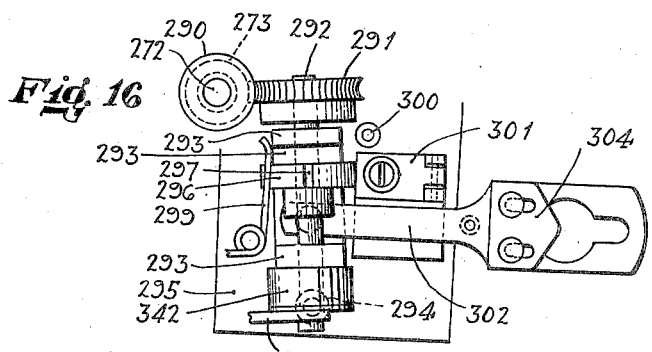
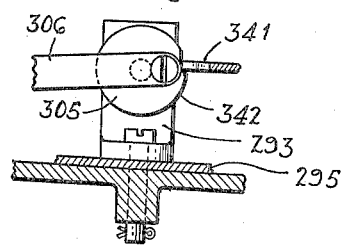
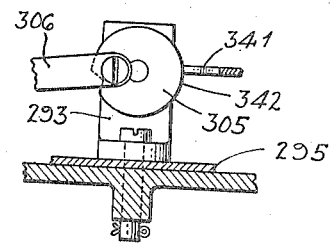
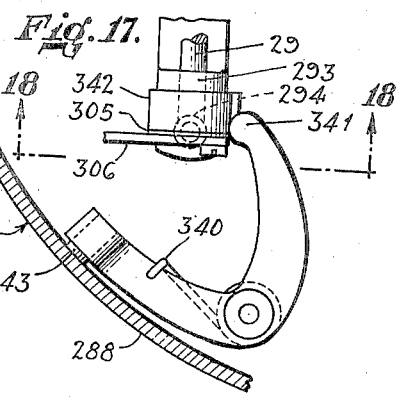
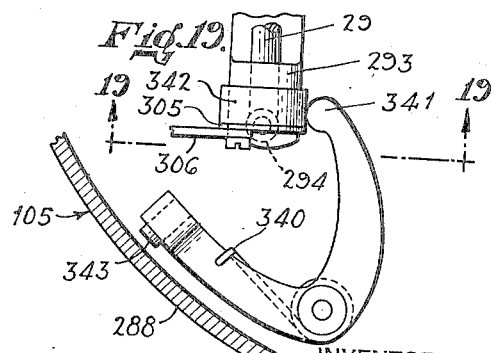
INVENTOR
ARNO RYSICK
BY
Richards & Geier
ATTORNEYS

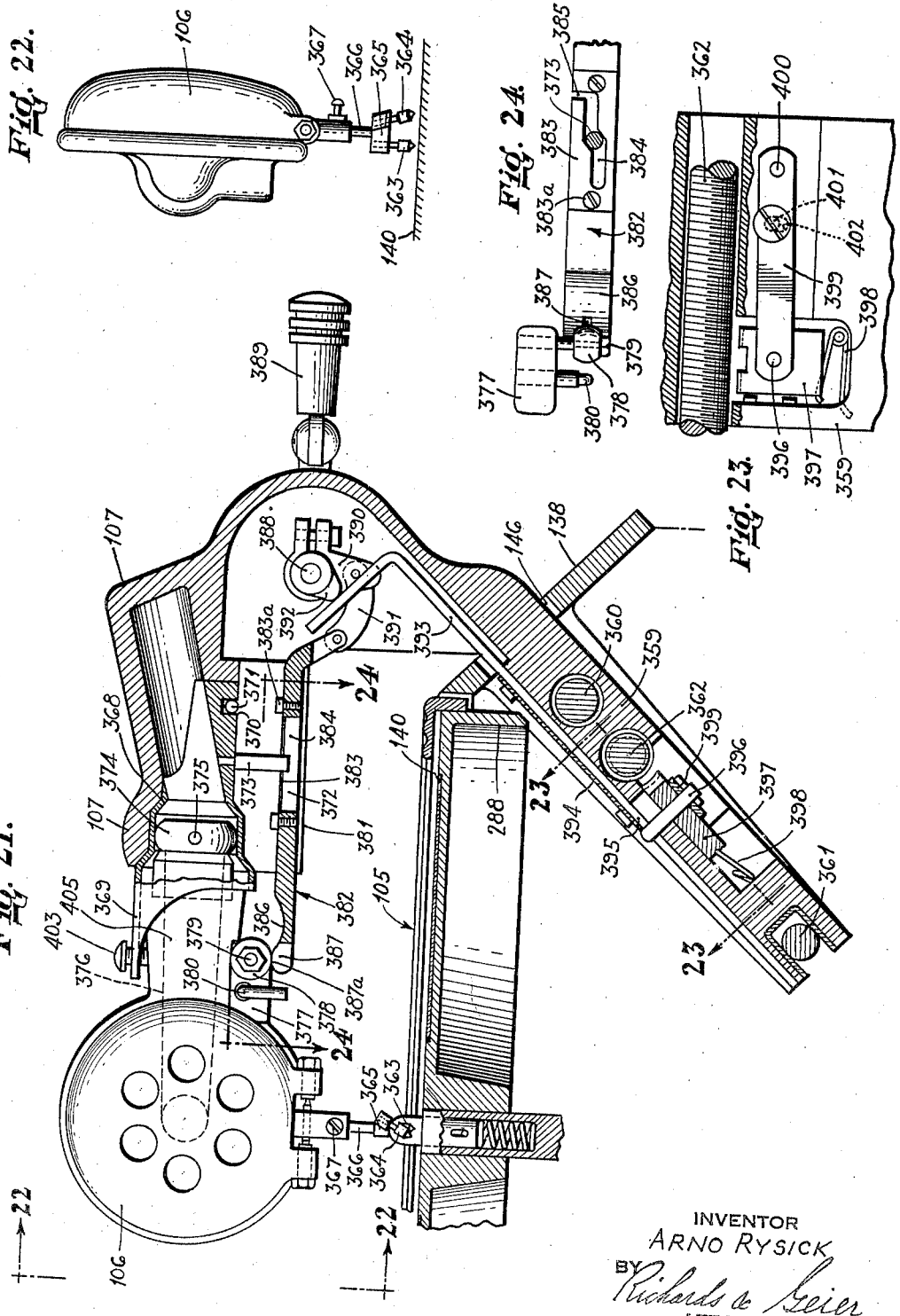

Jan. 14, 1941.    A. RYSICK    2,228,931
RECORDING AND REPRODUCING MACHINE
Filed Oct. 28, 1938    26 Sheets-Sheet 10
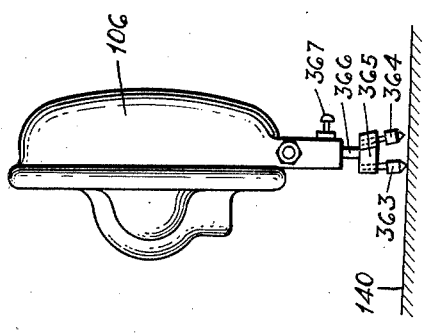
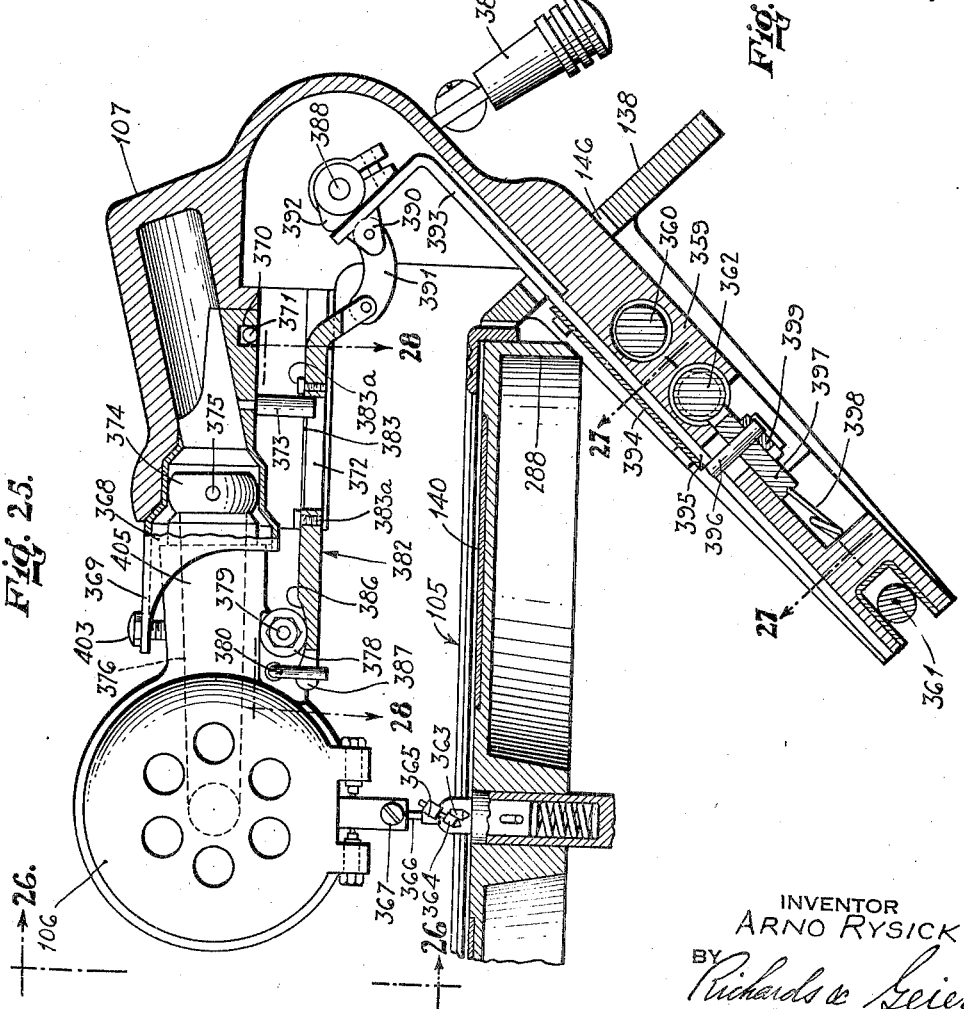
INVENTOR
ARNO RYSICK
BY Richards & Geier
ATTORNEYS Jan. 14, 1941.  A. RYSICK  2,228,931
RECORDING AND REPRODUCING MACHINE
Filed Oct. 28, 1938  26 Sheets-Sheet 11
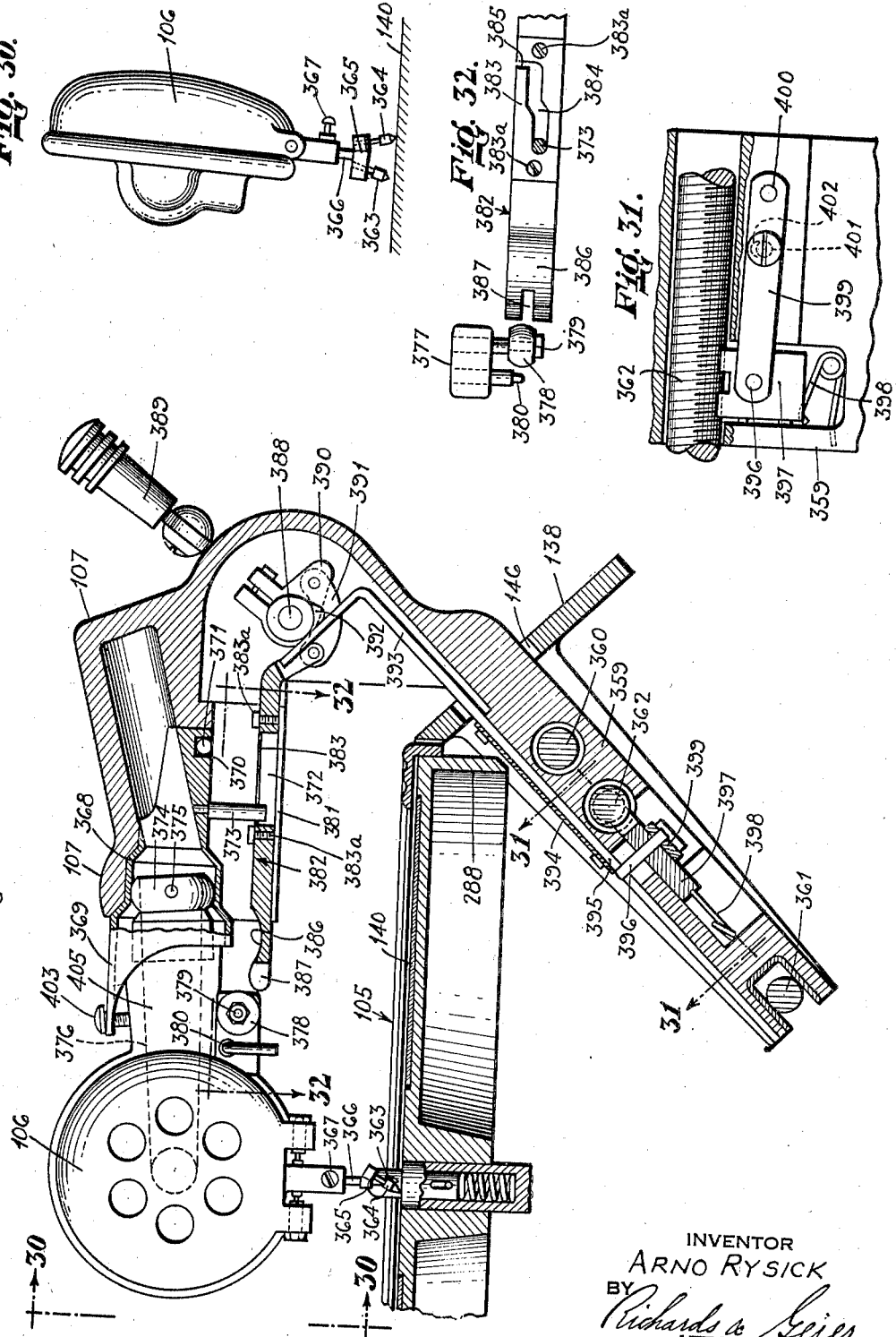
INVENTOR
ARNO RYSICK
BY
Richards & Geier
ATTORNEYS

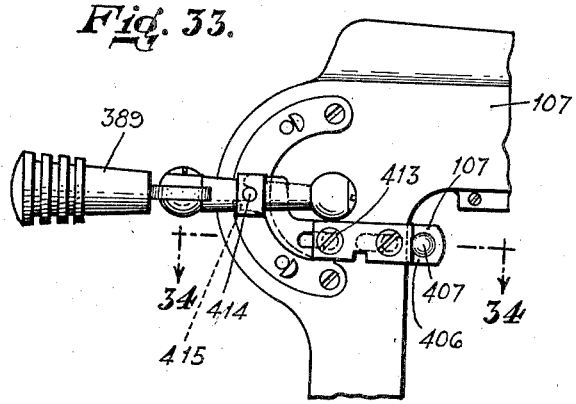
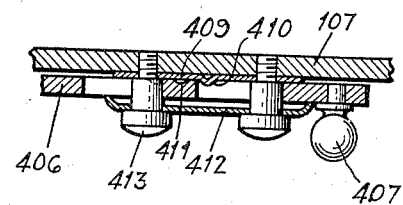
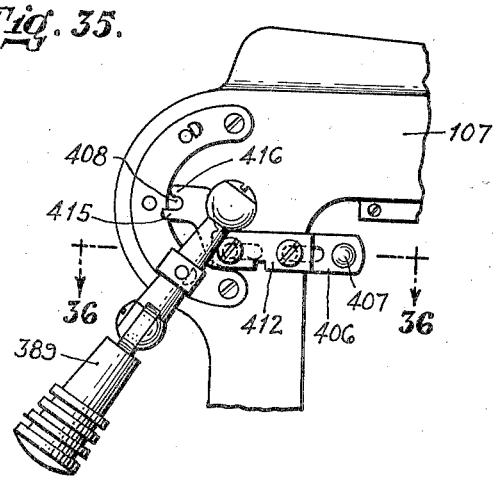
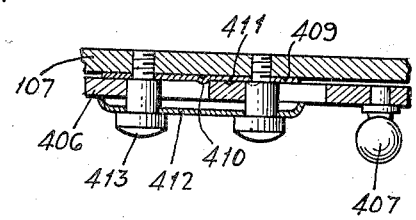
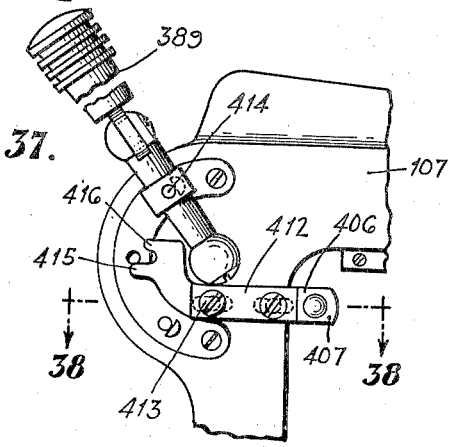
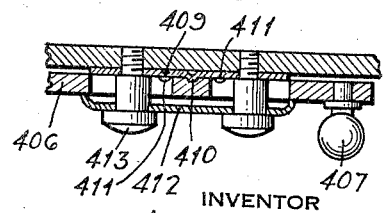

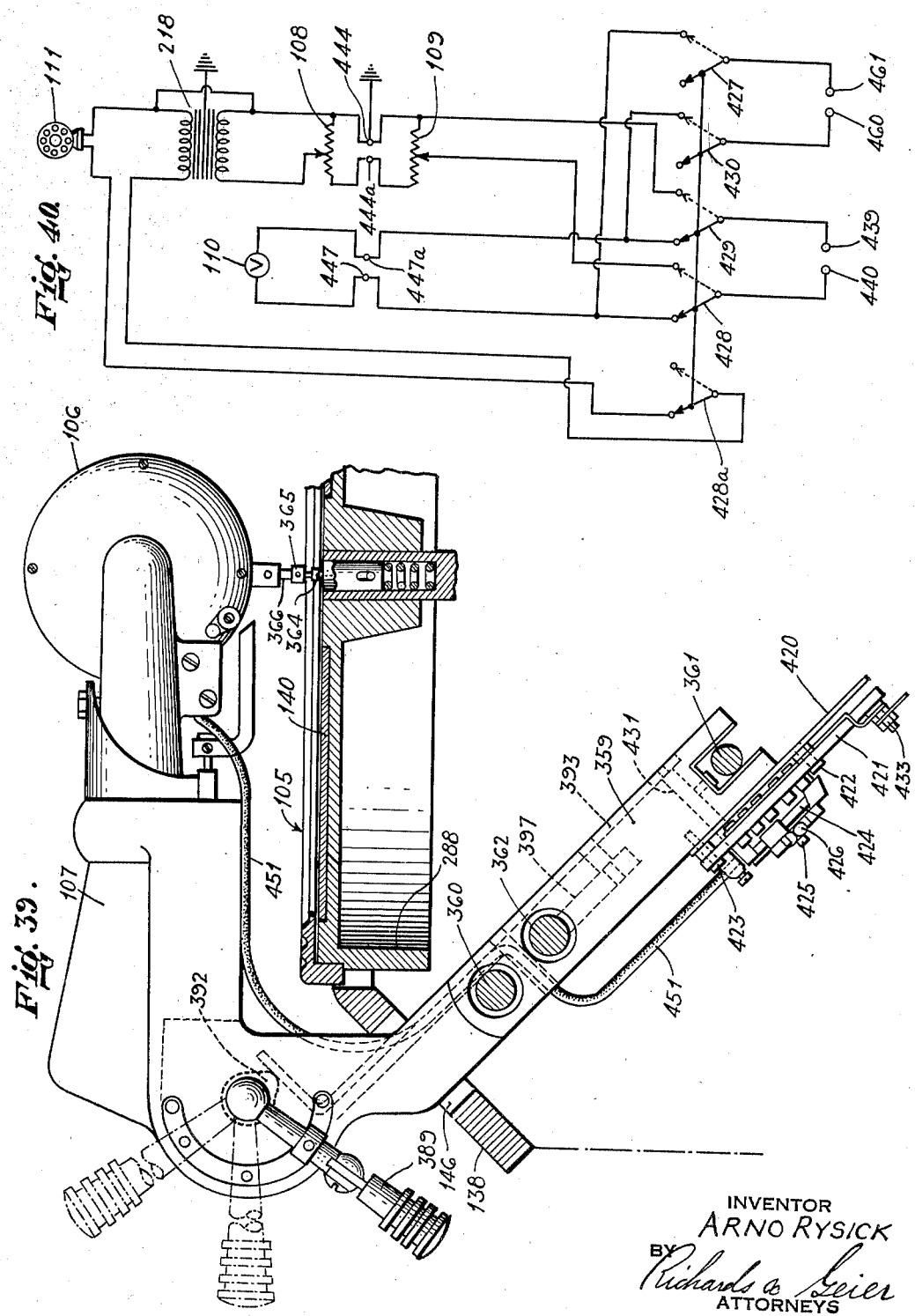

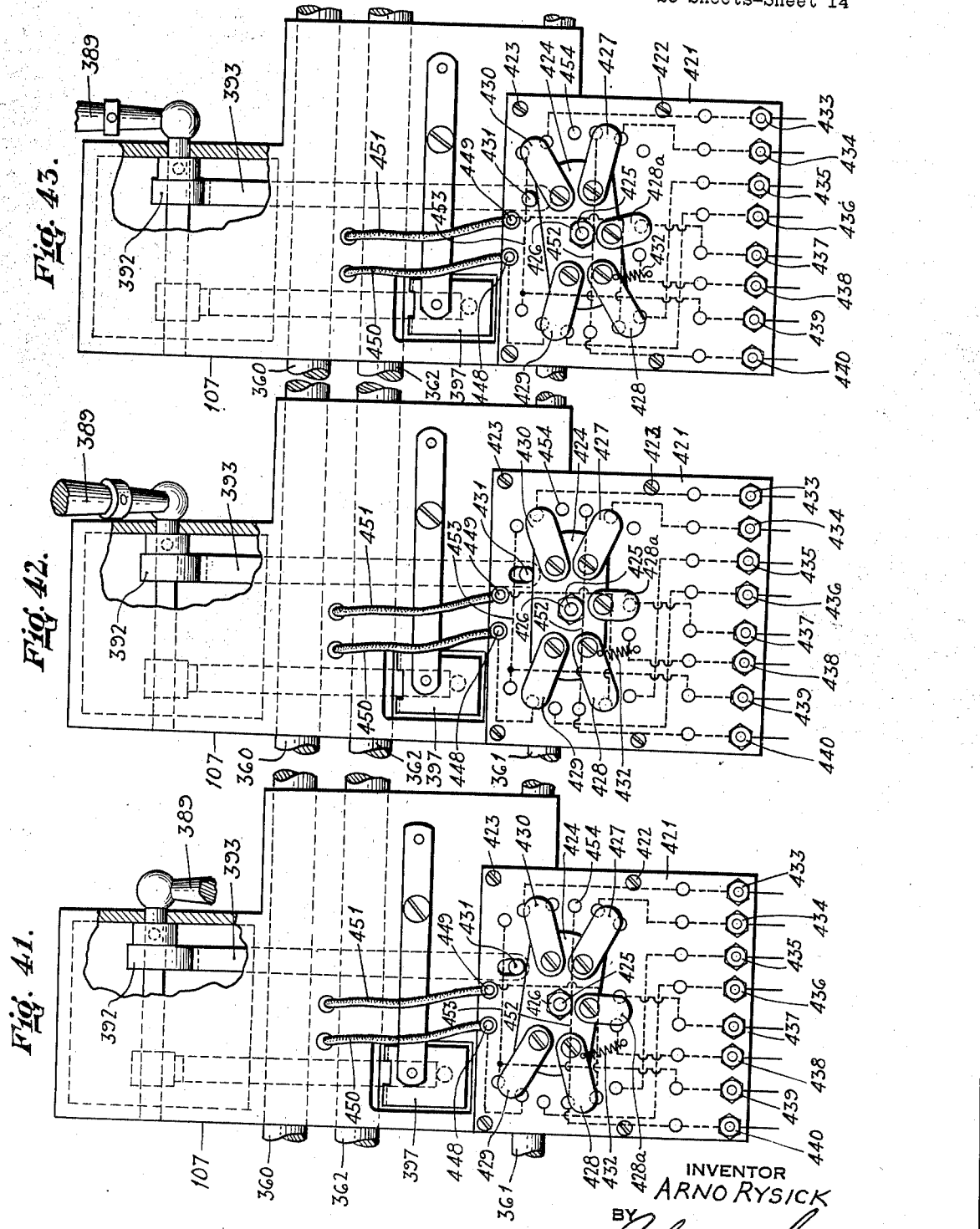

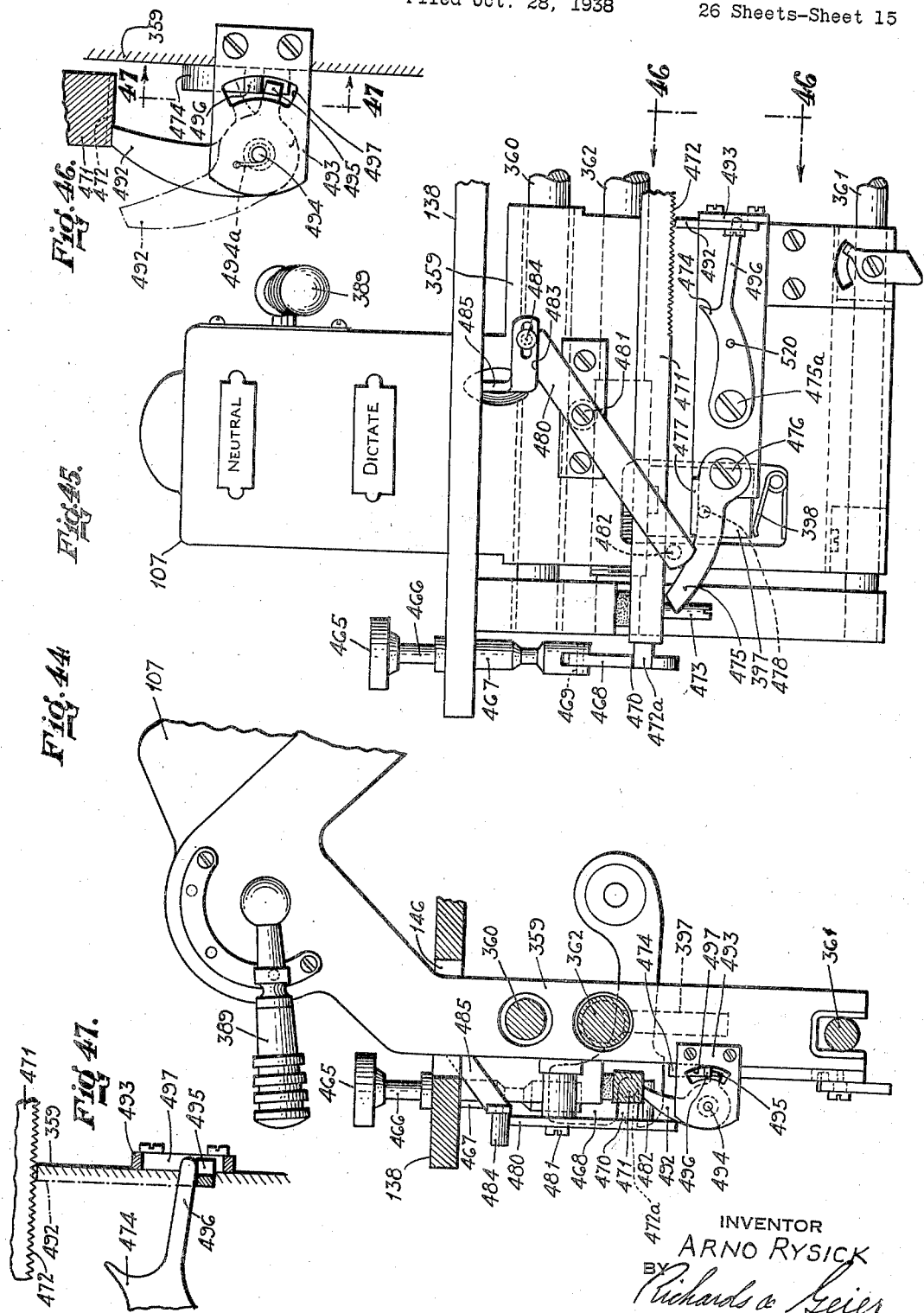

Jan. 14, 1941.  A. RYSICK  2,228,931
RECORDING AND REPRODUCING MACHINE
Filed Oct. 28, 1938   26 Sheets-Sheet 16

INVENTOR
ARNO RYSICK
BY
Richardson Geier
ATTORNEYS

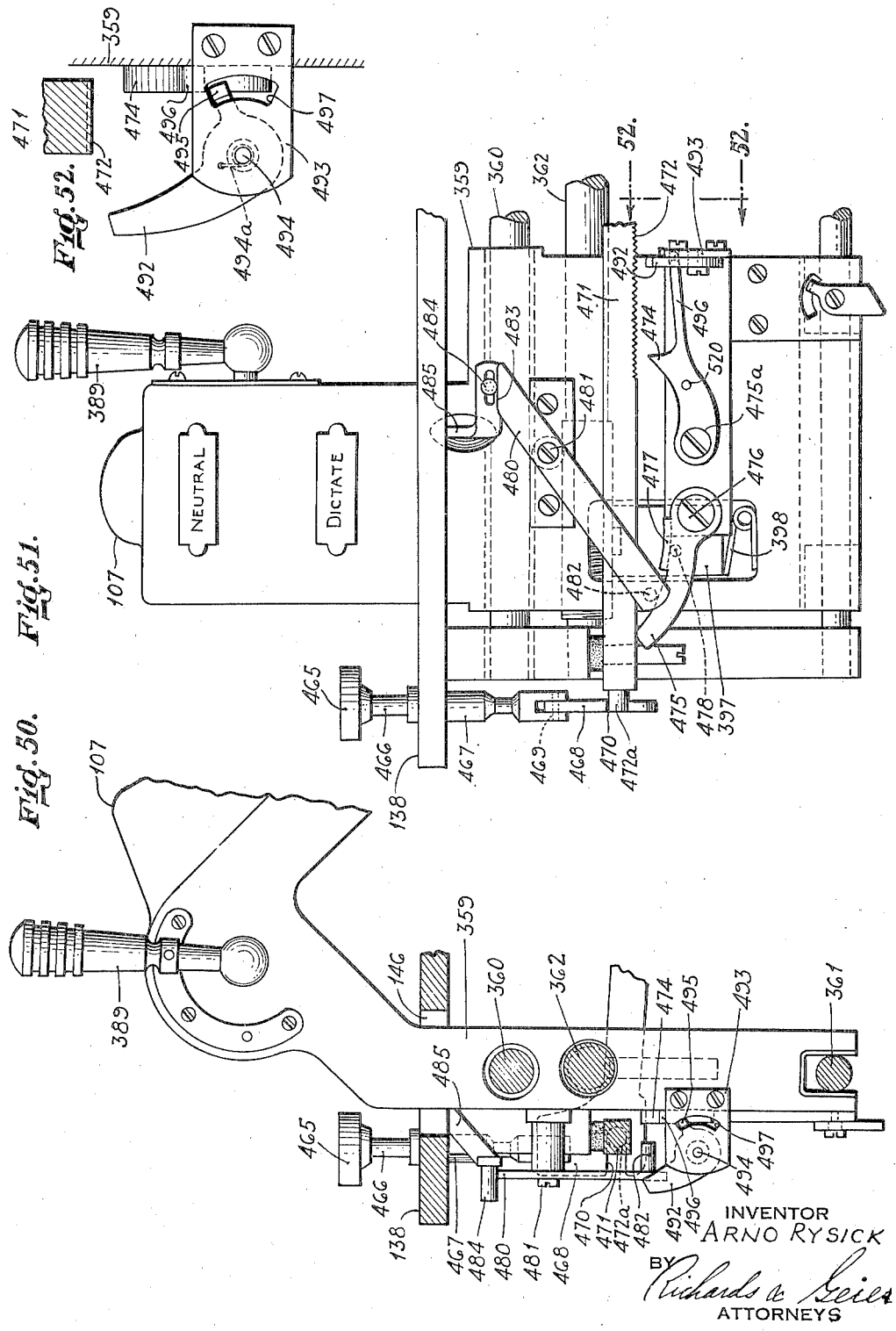

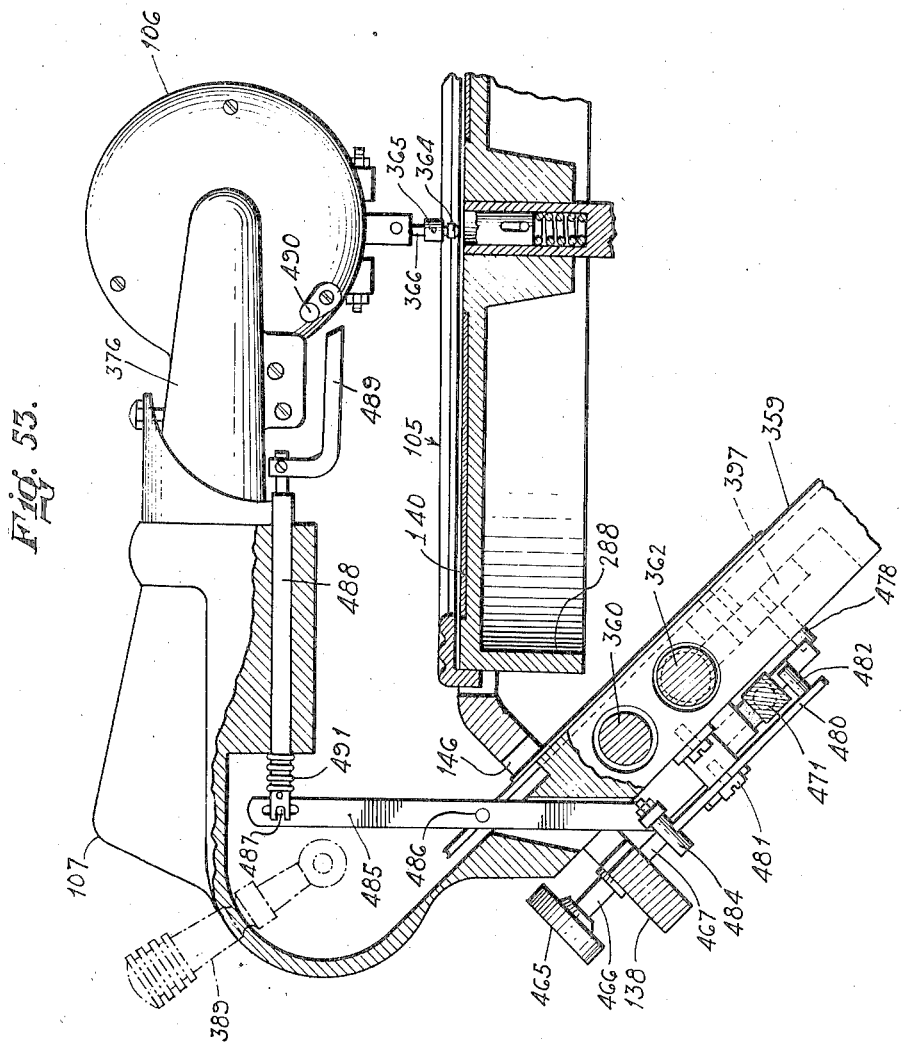

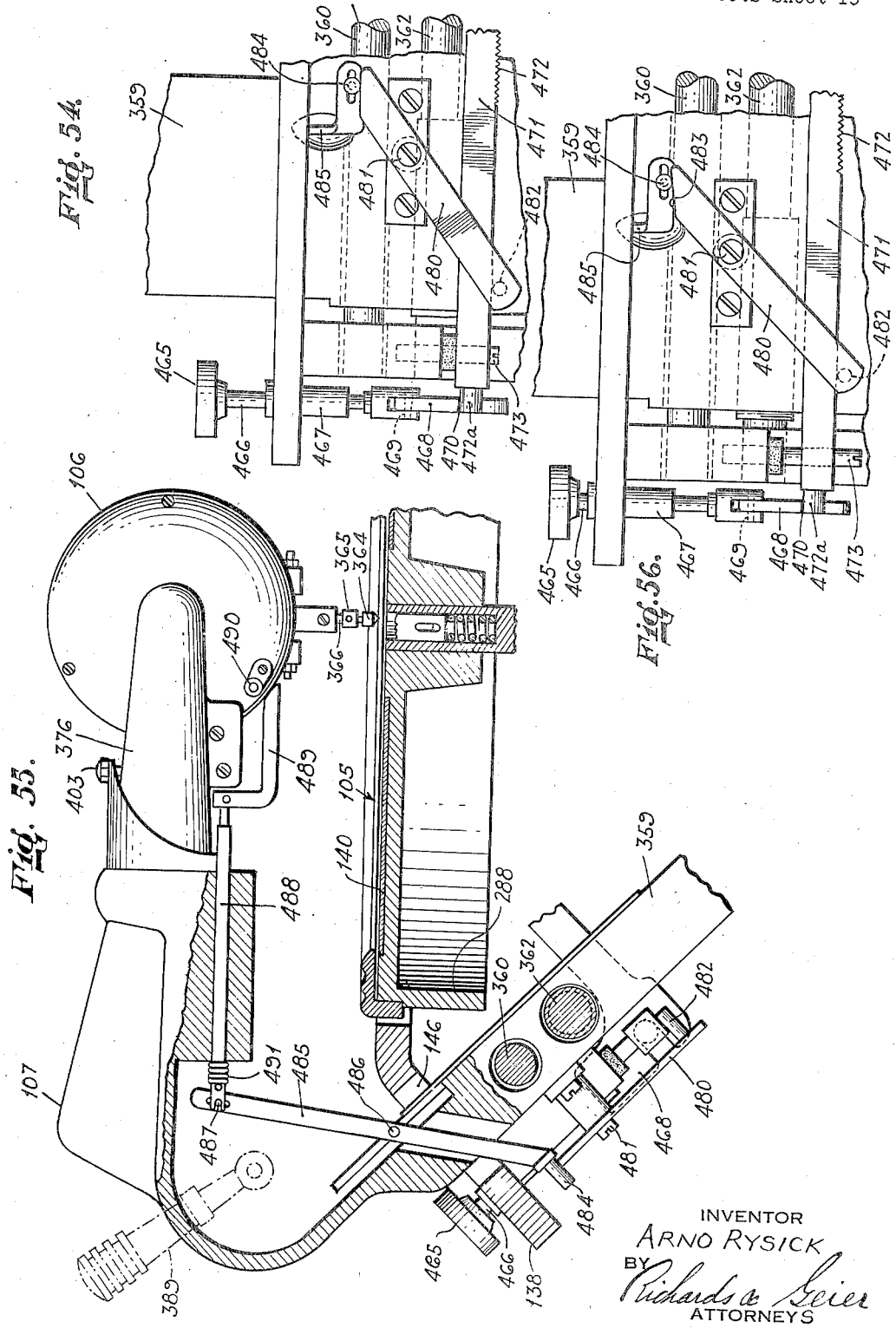

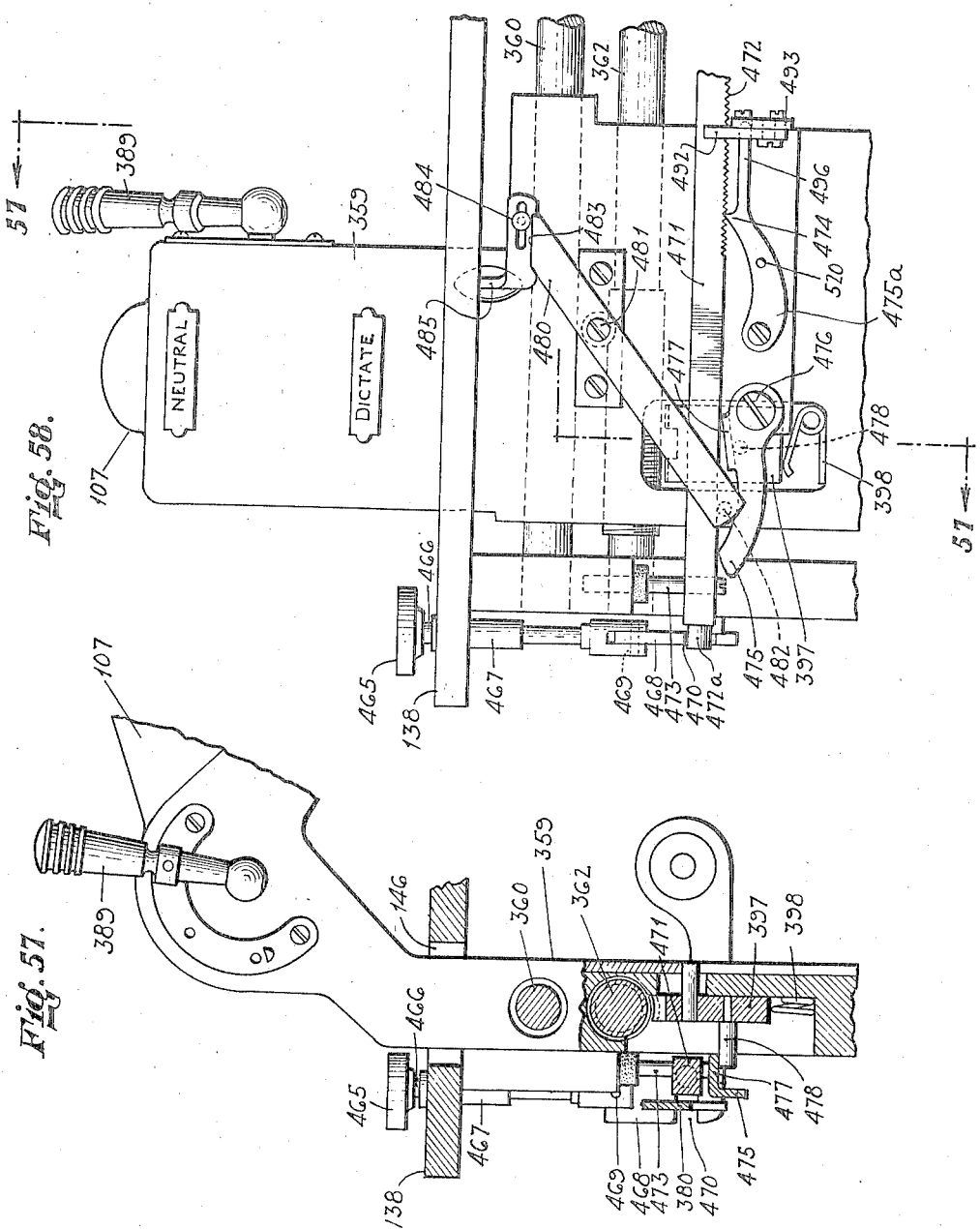

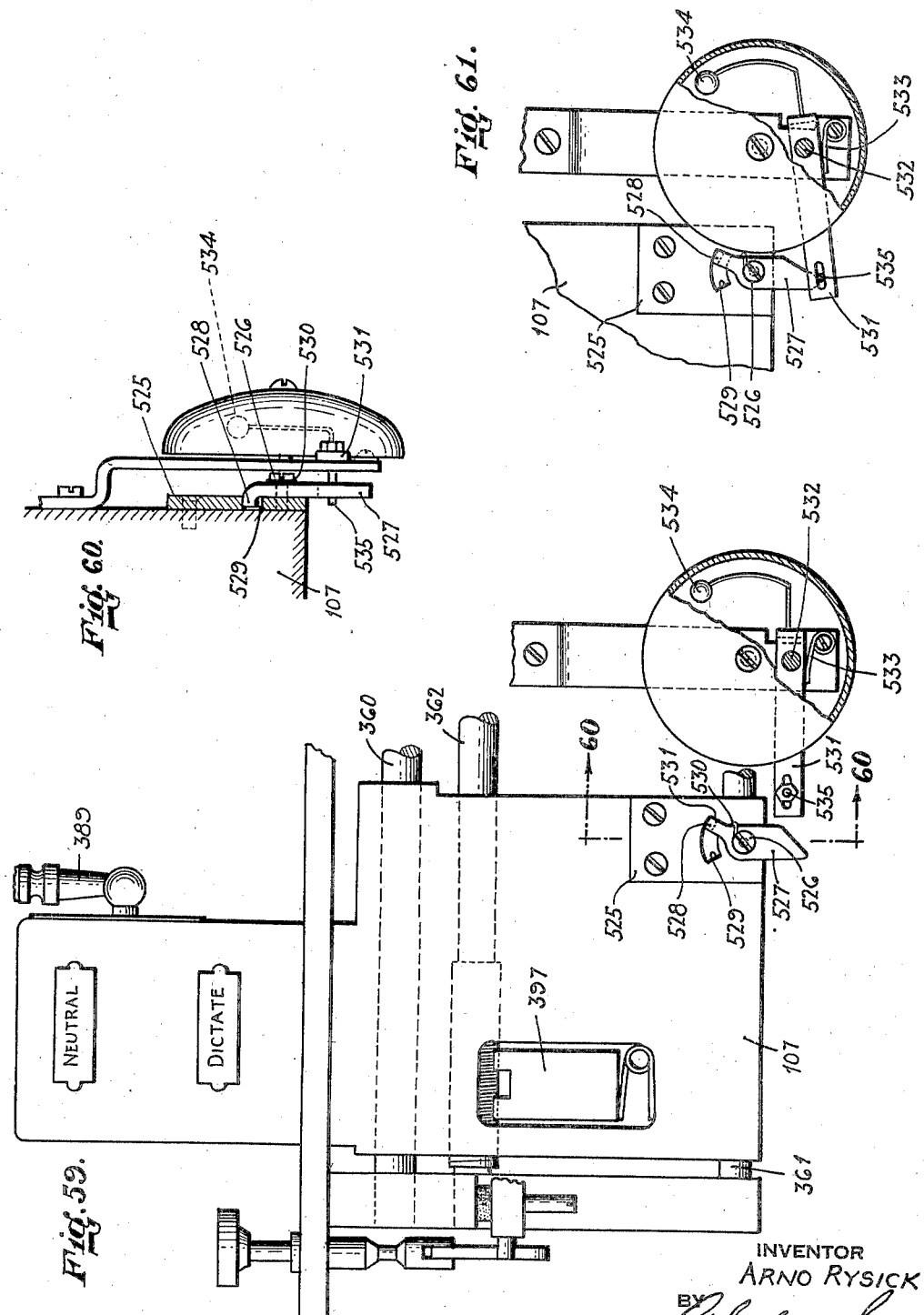

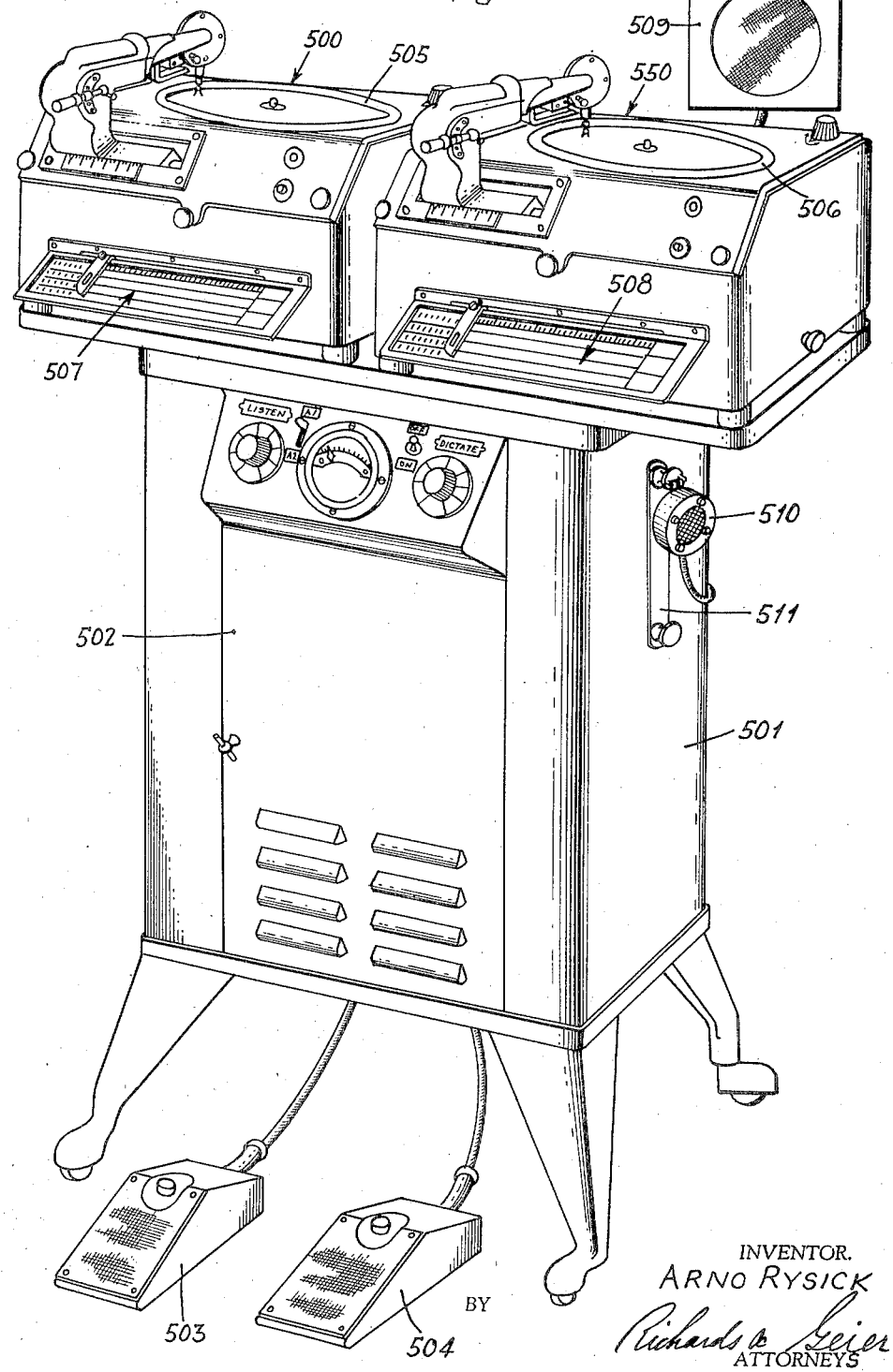

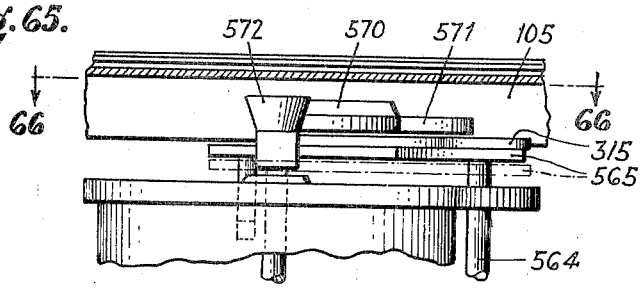
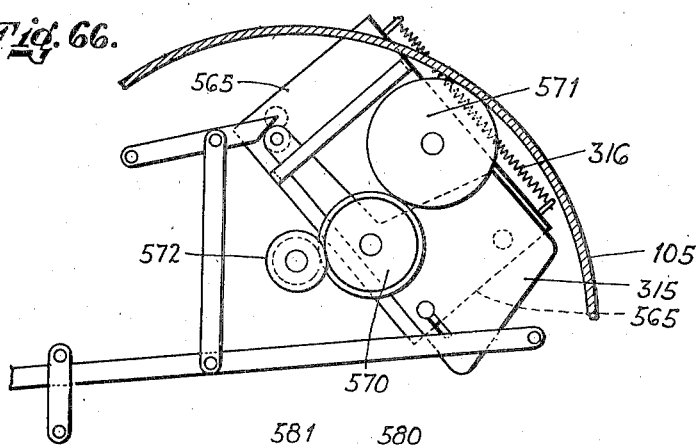
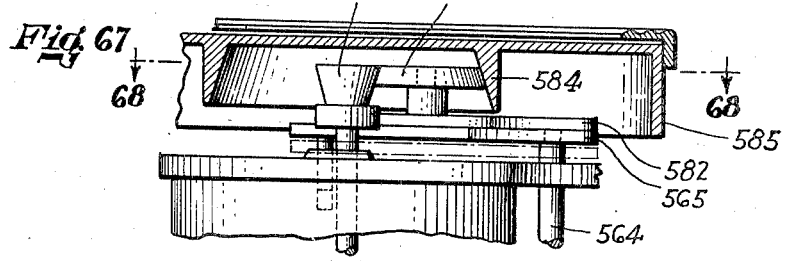
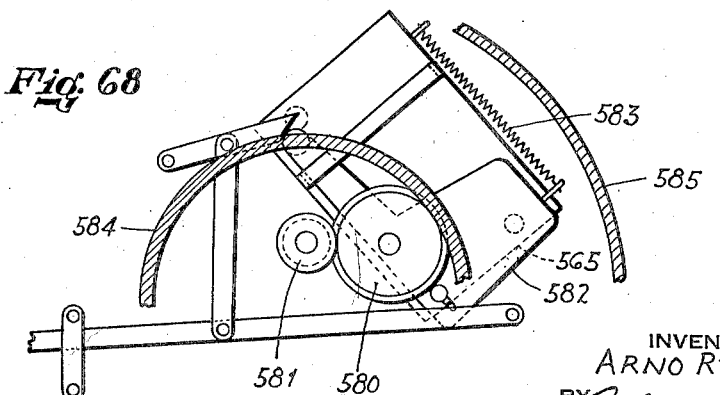

Jan. 14, 1941. A. RYSICK 2,228,931
RECORDING AND REPRODUCING MACHINE
Filed Oct. 28, 1938 26 Sheets-Sheet 24
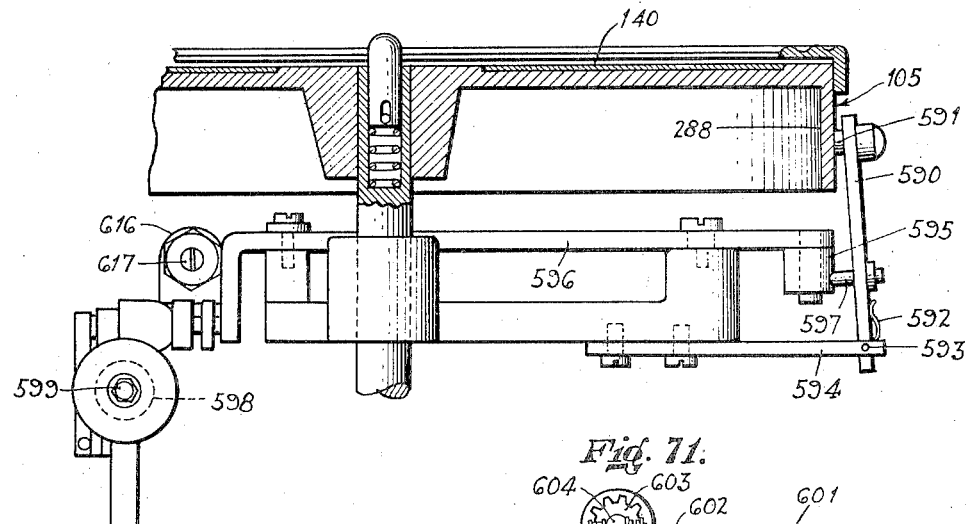
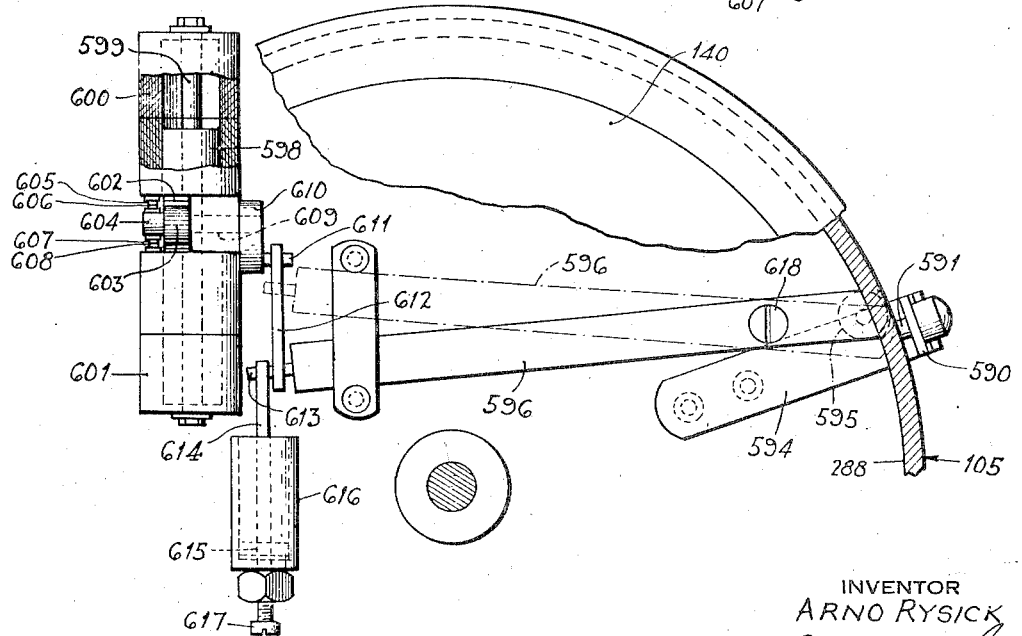
INVENTOR
ARNO RYSICK
BY
Richards & Geier
ATTORNEYS Jan. 14, 1941.   A. RYSICK   2,228,931
RECORDING AND REPRODUCING MACHINE
Filed Oct. 28, 1938   26 Sheets-Sheet 25
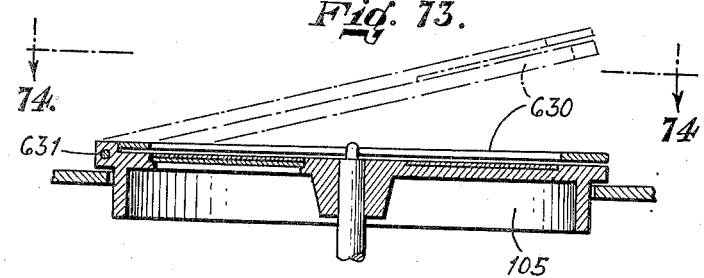
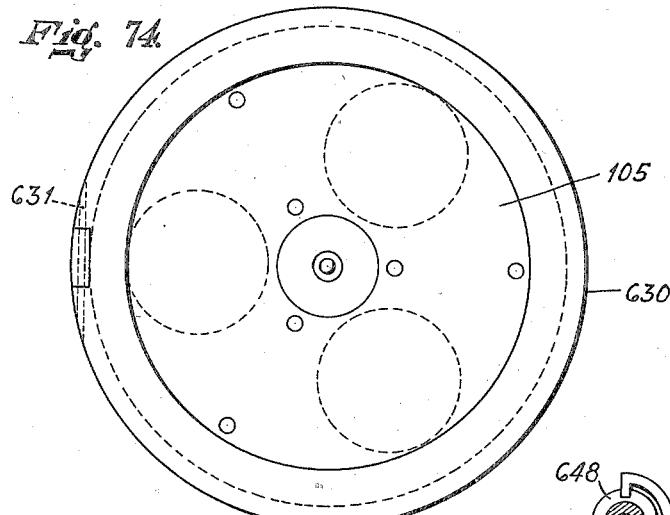
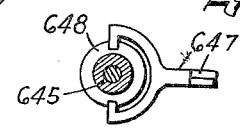
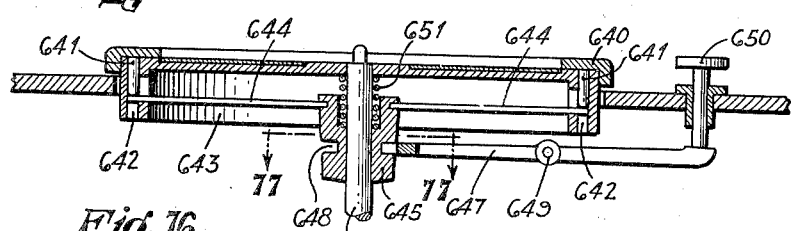
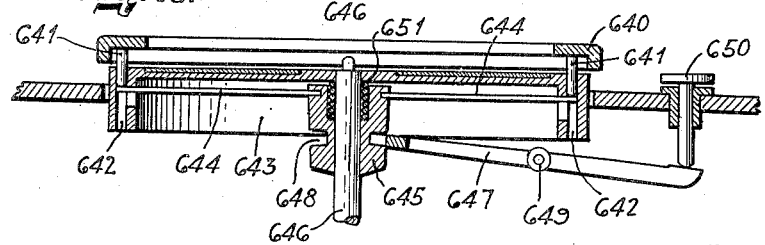
INVENTOR
ARNO RYSICK
BY
Richards & Geier
ATTORNEYS Jan. 14, 1941.   A. RYSICK   2,228,931
RECORDING AND REPRODUCING MACHINE
Filed Oct. 28, 1938   26 Sheets-Sheet 26

INVENTOR
ARNO RYSICK
BY Richards & Geier
ATTORNEYS

Patented Jan. 14, 1941

2,228,931

UNITED STATES PATENT OFFICE 2,228,931

RECORDING AND REPRODUCING MACHINE

Arno Rysick, Dresden, Germany

Application October 28, 1938, Serial No. 237,442
In Germany November 2, 1937

12 Claims. (Cl. 179—100.4)

This invention relates to electric recording and reproducing machines for discs or the like.

An object of the present invention is the provision of a recording and reproducing machine combined with a microphone, a loudspeaker, an amplifier and/or a telephone, which is effective in operation and sturdy in construction.

Another object of the present invention is the provision of a recording and reproducing device having no back coupling phenomena.

A further object is the provision of a recording and reproducing device wherein the outlet and inlet sides of the amplifier are not influenced during operation, thereby avoiding any interference with the recording and reproduction.

A still further object is the provision of a recording and reproducing device having easily operable means for varying the speed of rotation of the turntable.

Yet another object is the provision of means which combine the functions of a turntable brake and a turntable drive in such manner that the brake is automatically released at the time when the drive is set for operation.

Another object is the provision of means through the use of which the change from recording to reproducing and vice versa may be carried out easily and effectively.

A further object of the present invention is the provision of electrical controlling means which switch on and off a microphone, a loudspeaker, an amplifier and the like at the time when the sound box is switched from the recording position to the reproducing position and vice versa.

A still further object of the present invention is the provision of a return movement which is effectively combined with the recording and reproducing means.

Yet another object is the provision of a signalling device which automatically indicates certain conditions to the operator of a recording and reproducing machine.

Another object is the provision of a recording and reproducing machine having a sound volume control.

Other objects will be apparent in the course of the following specification.

The objects of the present invention may be realized, in part, through the provision of an electric recording and reproducing machine wherein the main switch is arranged separately from the other parts of the machine and is actuated by relays. The interior of the casing of the machine is preferably subdivided into a chamber containing the turntable motor, a chamber containing the switching device, a chamber containing the source of the speaking current, and a chamber for the amplifier. These chambers are separated by screens one from the other to avoid back coupling.

Several batteries are provided for the speaking current supply, a switch being used for alternately including these batteries in the circuit according to the extent of their discharge. Thus, the machine remains operable even in case of lengthy records, for example, when several discs are to be used in succession. Means are provided to recharge one battery while another is being operated. Means are also provided to connect the recording device to a telephone net, whenever it is necessary to record a telephone conversation.

An indicating device constructed as a voltmeter is included in the circuit and is used to indicate the degree of discharge of the battery in operation.

The turntable is driven by friction wheels which are movable along the conical surface of a driving member to vary the speed of rotation of the turntable. A brake lever which may be applied to the rim of the turntable to stop the same is raised and the frictional drive is simultaneously switched on by means of levers and cams actuated by an electromagnet the coil of which is connected to the main change-over switch. Suitable means are provided to lock the levers and cams after the drive and the brake have been actuated.

The change-over switch is connected by slides to the drive of the sound box carrier and to the sound box, so that the sound box is automatically turned and moved to a new position as soon as the change-over switch is actuated.

One of said slides which is supported by the sound box carrier and is used to switch on and off the drive for the sound box carrier, may be used to operate a switchboard by means of which the electrical connections to the microphone, the amplifier, the loudspeaker and the like are automatically switched on and off by the operation of the same change-over switch. The microphone may be connected by suitable means to a circuit supplied by a current of high or normal voltage.

The return movement of the recording and reproducing machine is combined with a steering device by means of which the reproducing stylus is raised from the record when the return movement switch is operated at the time when the machine is in its reproducing position. This steering device is switched off entirely when the machine is in its recording position.

A bell ringing device is placed in the path of the sound box carrier to indicate to the user that the inscription of a record is about to be completed.

The sound box is provided with damping means used to damp the vibrations of the diaphragm when the sound is too loud.

The invention will appear more clearly from the following detailed description when taken in connection with the accompanying drawings, showing by way of example preferred embodiments of the inventive idea.

In the drawings:

Figure 6 is a front view of the motor and shows the drive for the turntable and a device for varying the speed thereof;

Figure 7 is a detailed section along the line 7—7 of Figure 6;

Figure 8 is a detailed section along the line 8—8 of Figure 6;

Figure 9 is a top view of a brake and switching means for the disc carrier;

Figure 10 is a section along the line 10—10 of Figure 9;

Figure 11 is a bottom view along the line 11—11 of Figure 10;

Figure 15 is a side view of a part of the device shown in Figures 9 and 12;

Figure 16 is a top view of the device shown in Figure 15;

Figure 17 shows the brake lever in operation;

Figure 18 is a section along line 18—18 of Fig. 17 showing the brake lever cam;

Figure 19 is similar to Figure 17 and shows the brake lever in its off position;

Figure 20 is similar to Figure 18 and shows the device in its off position;

Figure 21 shows the carriage of the recording and reproducing device in section;

Figure 22 is a front view of the sound box;

Figure 23 is a section along the line 23—23 of Fig. 22 showing a portion of the driving means;

Figure 24 is a detailed view along the line 24—24 of Fig. 21 illustrating some of the elements shown in Figure 21;

Figure 25 is similar to Figure 21 and shows the device in its recording position;

Figure 26 is similar to Figure 22 and shows the sound box in its recording position;

Figure 27 is similar to Figure 23, showing the parts in the recording position;

Figure 28 is similar to Figure 24 and shows the parts in the recording position;

Figure 29 is similar to Figure 25 and shows the device in the reproducing position;

Figure 30 is similar to Figure 26 and shows the sound box in the recording position;

Figure 31 is similar to Figure 27 and shows the device in the listening position;

Figure 32 is similar to Figure 28 and shows the device in the listening position;

Figure 33 shows the switching lever for the sound box carrier in its locked position;

Figure 34 is a section along the line 34—34 of Figure 33;

Figure 35 is similar to Figure 33 and shows the lever in the recording unlocked position;

Figure 36 is a section along the line 36—36 of Figure 35;

Figure 37 is similar to Figures 33 and 35 and shows the lever in the listening half-locked position;

Figure 38 is a section along the line 38—38 of Figure 37;

Figure 39 shows the sound box carrier with electric pickup in side view, some parts being shown in section;

Figure 40 is a diagram illustrating the electrical connections of the device shown in Figure 39;

Figure 41 shows the sound box carrier in front view in the recording position;

Figure 42 is similar to Figure 41 and shows the device in the off position;

Figure 43 is similar to Figures 41 and 42 and shows the device in the reproducing position;

Figure 44 shows a part of the sound box carrier in the recording position in side elevation showing those parts of the machine which are used for the reverse switching;

Figure 45 is a front view of the part of the sound box carrier shown in Fig. 44;

Figure 46 is a detailed view along line 46—46 of Fig. 45;

Figure 47 is a section along the line 47—47 of Figure 46;

Figure 50 is a side view, partly in section, of a part of the sound box carrier, the lever of the sound box being situated in the reproducing position;

Figure 51 is similar to Figure 45 and shows parts in a different position;

Figure 52 is a detailed view along the line 52—52 of Figure 51;

Figure 53 is a section through the sound box carrier and the turntable, the back spacing device being shown in its original position;

Figures 54 and 55 are side elevations of the device shown in Figure 51, the back spacing switch being shown in a different position;

Figure 56 shows the device in the course of the back spacing movement;

Figure 57 shows the spacer key while it is pressed down, and is a section along the line 57—57 of Figure 58;

Figure 58 is a front view of the device shown in Figure 57;

Figure 59 is a front view illustrating the bell ringing device;

Figure 60 shows the bell in side elevation and is a section along the line 60—60 of Figure 59;

Figure 61 shows a part of the bell ringing device in a different position;

Figure 62 is a perspective view of a somewhat differently constructed sound recording and reproducing device;

Figure 63 shows different means for varying the speed of rotation of the turntable;

Figure 64 is a section along the line 64—64 of Figure 63;

Figure 65 illustrates a frictional drive for the turntable having two friction wheels of different size;

Figure 66 is a section along the line 66—66 of Figure 65;

Figure 67 shows a frictional drive having one frictional wheel in side elevation and partly in section;

Figure 68 is a section along the line 68—68 of Figure 67;

Figure 69 shows a braking device for the turntable;

Figure 70 is a top view of the device shown in Figure 69;

Figure 71 shows a coupling magnet in side view;

Figure 72 is a section through a Bowden thread connection for the turntable driving means;

Figure 73 shows a turntable provided with an articulated frame in section;

Figure 74 is a top view along the line 74—74 of Figure 73;

Figure 75 is similar to Figure 73 and shows a frame which may be raised in a parallel direction;

Figure 76 is similar to Figure 75 and shows the frame in its raised position;

Figure 77 is a section along the line 77—77 of Figure 75;

Figure 1:
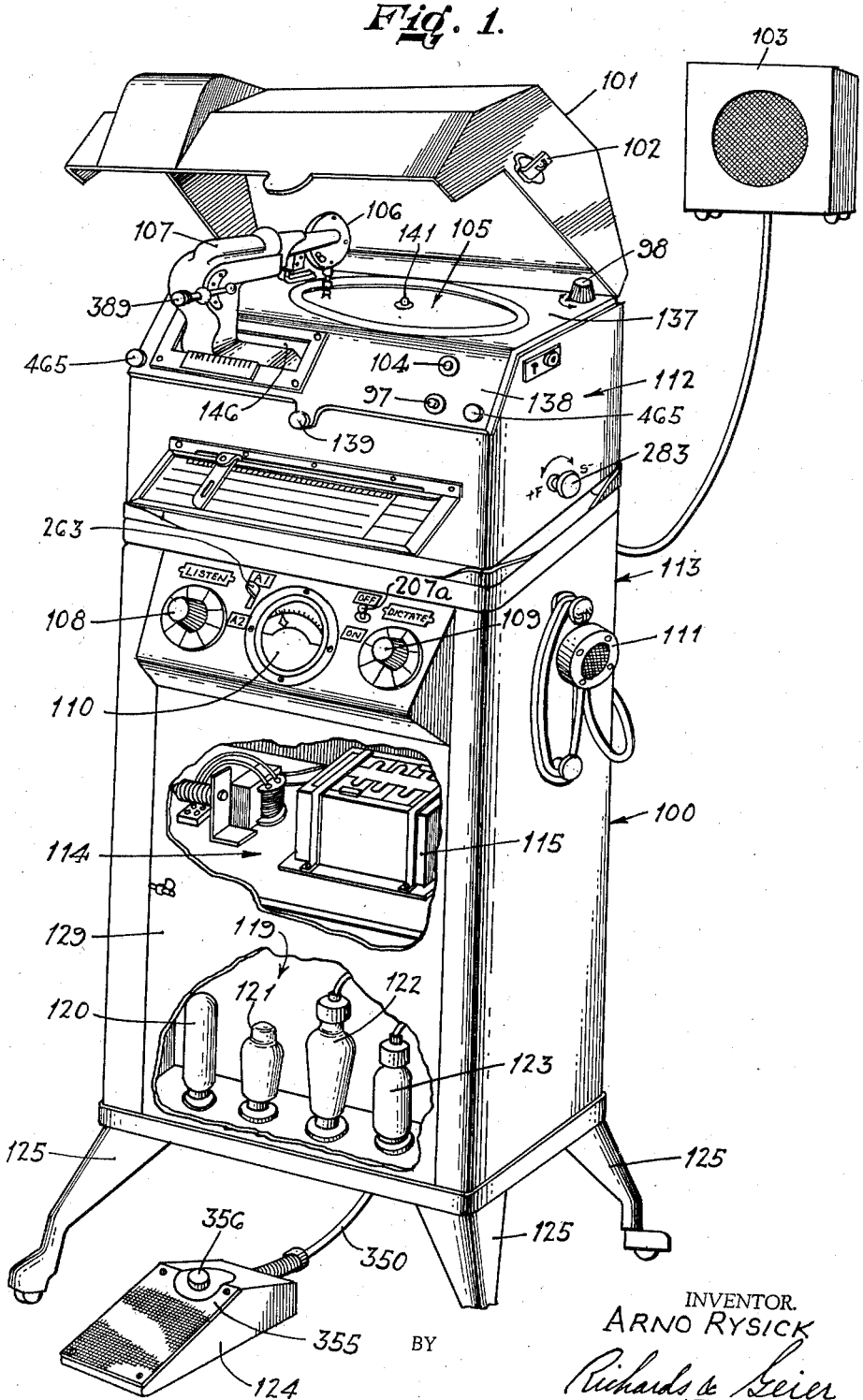
Figure 1 is a perspective view of a recording and reproducing machine constructed in accordance with the principles of the present invention, with some parts broken off.

The machine shown in the drawings comprises a casing 100 having a hinged cover 101 provided with a lock 102 (Figure 1). A loudspeaker 103 is connected to the machine by a cable, as will be described in detail hereinafter.

The machine comprises a turntable 105, a sound box 106, a sound box carrier 107, controls or potentiometers 108 and 109, an amperemeter 110, and a microphone 111.

The interior of the casing 100 is subdivided into substantially four compartments situated one over the other. The top compartment 112 contains the motor for the turntable. The electrical connections and switching means are situated in the second compartment 113 under the compartment 112. The third compartment 114 contains the speaking current supply, including the storage battery 115. The lowest compartment 119 has a grid glow regulating valve 120, a rectifying tube 121, a terminal tube 122, an indirectly heated triode tube 123, and the entire amplifying unit.

A foot switch 124 is situated substantially underneath the casing 100, which is carried by the legs 125.

Figure 2:
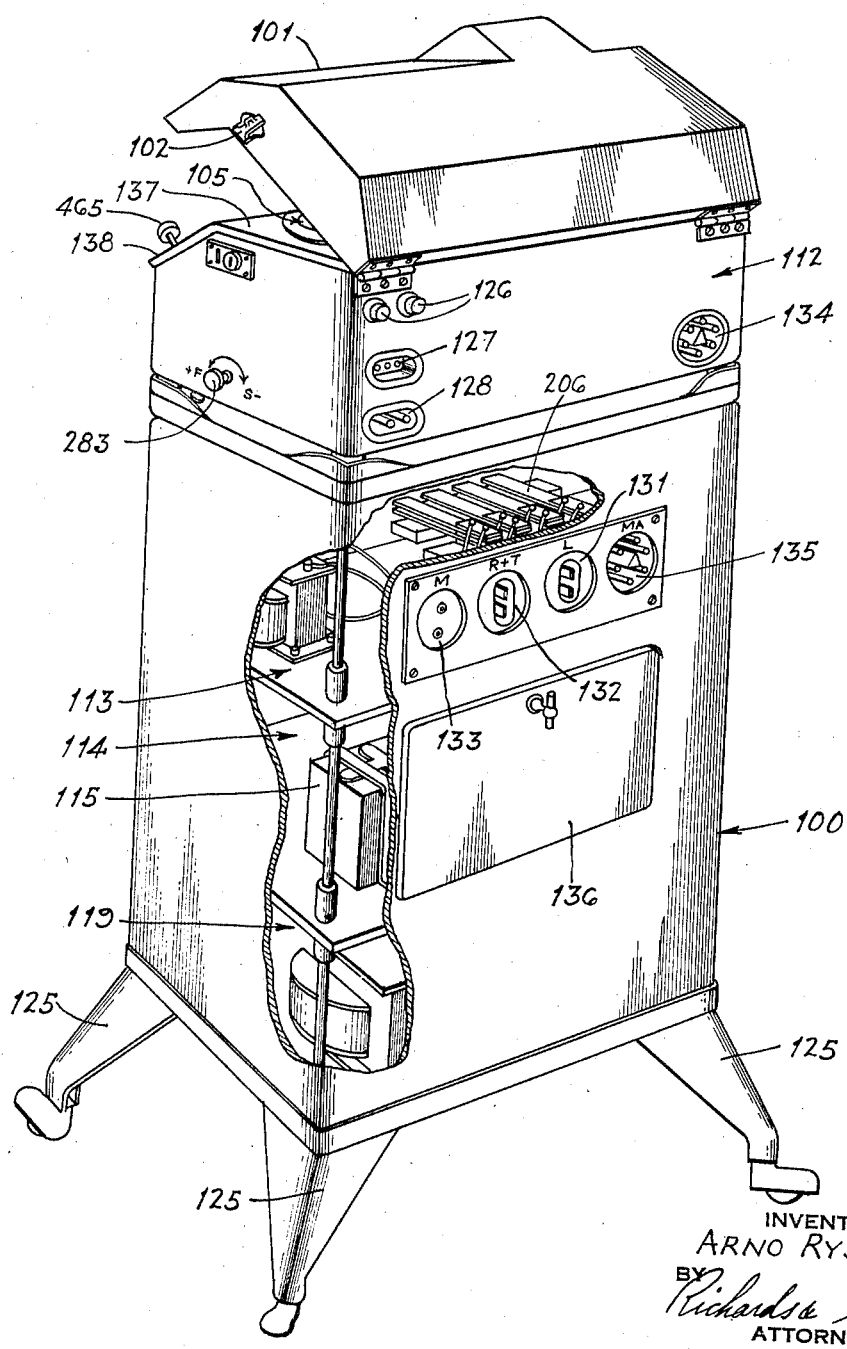
Figure 2 is a rear view of the machine shown in Figure 1, with some parts broken off.

Figure 2, which is a general view of the machine from the rear, shows that the upper compartment 112 carries fuses 126, a connection 127 to the foot switch 124 (Figure 1), and a connection 128 to a power source.

As shown in Figure 2, the second compartment 113 also contains relays, and switches operated thereby, which will be described in greater detail hereinafter. It also comprises a connection 131 for the loudspeaker 103, a radio or telephone connection 132, and a connection 133 for the microphone 111. The machine connection 134 is adapted to be connected to the amplifier connection 135. For simplicity's sake, these connections are not shown in the wiring diagram of Figure 5.

The chambers 114 and 119 of the casing 100 are accessible through a front door 129 (Figure 1), while a rear door 136 shown in Figure 2 leads to the compartment 114.

Figure 3:
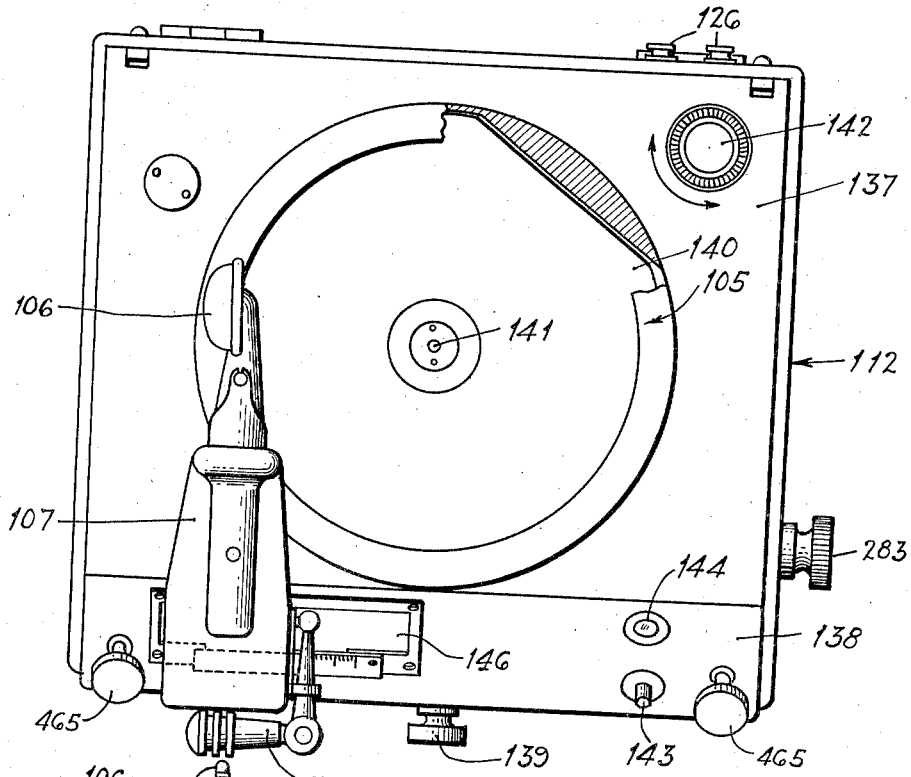
Figure 3 is a top view of the machine with the cover removed.
Figure 4:
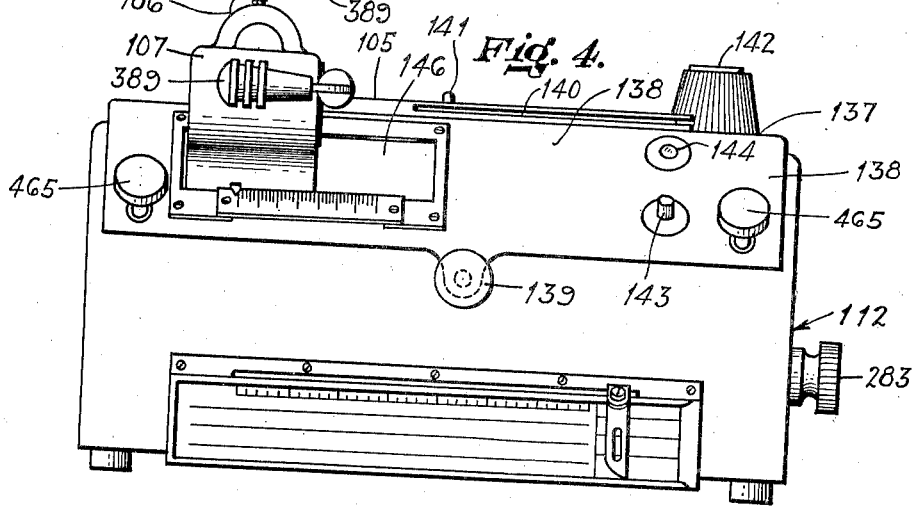
Figure 4 is a front view of the top part of the machine.

Figures 3 and 4 show the upper portion 112 of the device, which includes the motor for the turntable 105 and the electric pickup or sound box 106 for recording and reproduction.

The portion 112 of the casing 100 is provided with a movable top plate or cover 137 having a sloping front portion 138 and hingedly connected with the casing portion 112. A set screw 139 which is situated in the front top portion 139 of the machine is used for closing the cover 137 and may be screwed for that purpose into a threaded bore hole, which is not shown in the drawings.

The turntable 105 is located in a suitable recess or opening formed in the cover 137. A disc or record 140 may be inserted into that recess and placed upon the turntable 105. The turntable 105 carries the centering pin 141. A switch 142 is used for adjusting the speed of the turntable 105.

Another switch 143 is used for starting and stopping the driving motor for the turntable. A control lamp 144 is used to indicate the operation of the motor.

The sound box carrier 107 extends through an opening 146 formed in the sloping part 138 of the cover 137. The sound box carrier 107 supports the sound box 106, which is provided with a recording stylus and a reproducing stylus.

A hand switch 389 (Fig. 1) is used for changing the sound box 106 from a recording position to a reproducing position and vice versa. The switch 389 simultaneously operates the electrical switch 207 diagrammatically illustrated in Figure 5 of the drawings. The main switch 207a (Fig. 1) is used for switching on and off the current supply.

Figure 5:
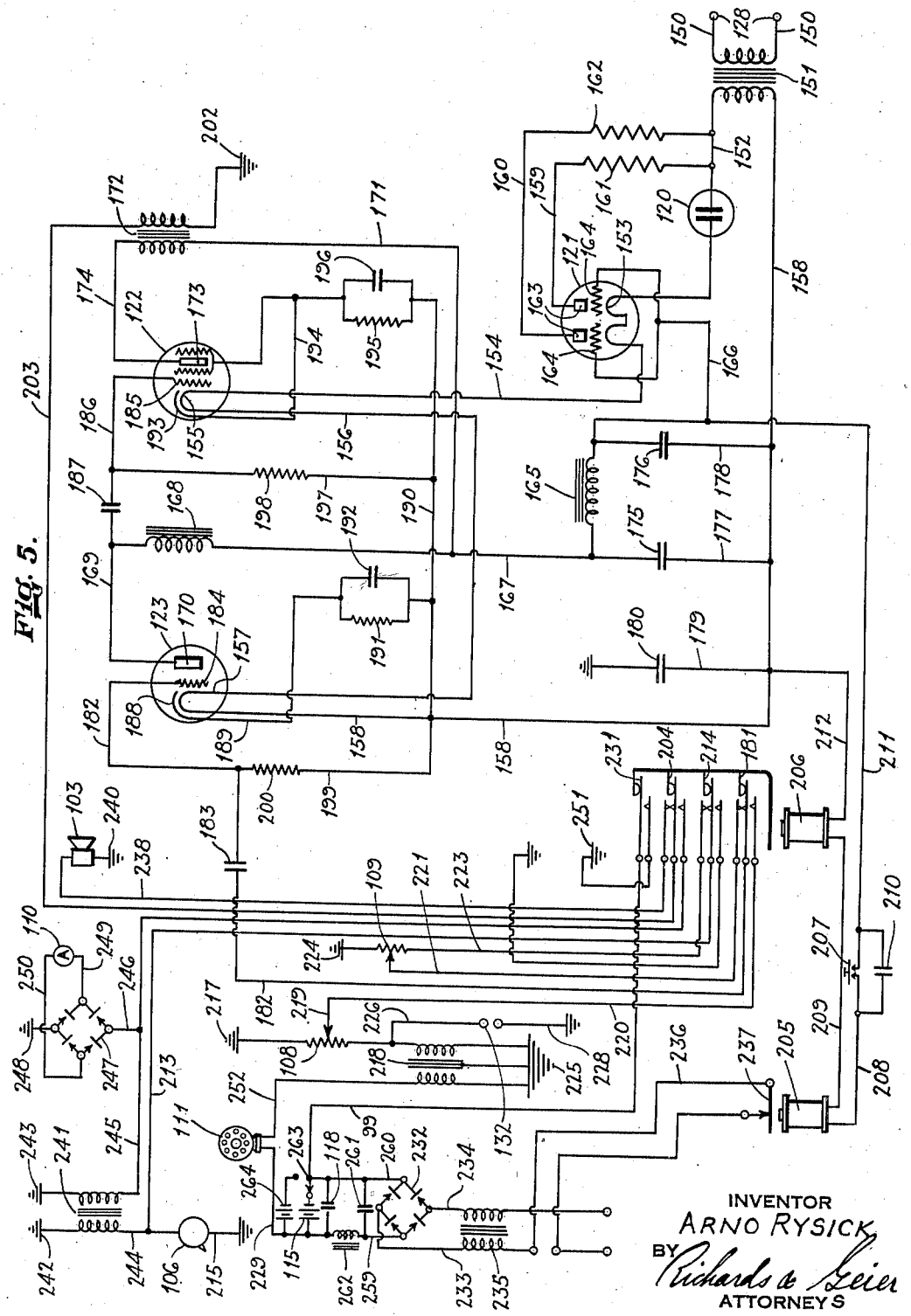
Figure 5 is a diagram illustrating the electrical connections of the machine.

The electrical current is supplied through the connection 128 which is connected by wires 150 to an input transformer 151 (Fig. 5).

The secondary side of the transformer 151 is connected by the wire 152 with the regulating valve 120 which is connected with the heating filament 153 of the rectifying tube 121. A wire 154 connects the filament 153 with the filament 155 of the terminal tube 122. The wire 156 connects the filament 155 to the filament 157 of the indirectly heated triode tube 123.

The return wire 158 connects the filament 157 to the secondary side of the input transformer 151.

Two conducting wires 159 and 160 are branched off the wire 152 and are connected with resistances 161 and 162, respectively. The wires 159 and 160 lead to the anodes 163 of the rectifying tube 121.

The grid 164 of the rectifying tube 121 is connected to a choke coil 165 by means of the wire 166. A wire 167 leads to another choke coil 168 which is connected by the wire 169 with the anode 170 of the indirectly heated triode tube 123.

A wire 171 branches off the wire 167 and leads to the primary side of an amplifier or output transformer 172. The anode 173 of the terminal tube 122 is connected by means of the wire 174 to the opposite end of the primary winding of the transformer 172.

Two condensers 175 and 176 are situated on both sides of the choke coil 165 and are connected by the wires 177 and 178, respectively, to the wire 158. This wire is grounded by means of a branch wire 179, which connects the wire 158 to one of the plates of a grounded condenser 180.

A switch 181 is connected to the input side of the transformer 172 by means of a wire 182 to which a grid condenser 183 is connected. The wire 182 leads to the grid 184 of the indirectly heated triode tube 123.

The grid 185 of the terminal tube 122 is connected by the wire 186 with the condenser 187 and the wire 169.

The screening grid 188 of the valve 123 is connected by a wire 189 to the wire 190, a resistance 191 and a condenser 192 being interposed between the screening grid 188 and the conducting wire 190. Similarly, the screening grid 193 of the tube 122 is connected by a wire 194 with the resistance 195, the condenser 196 and the wire 190.

The wire 190 is also connected with the wire 186 by means of a wire 197 which includes a resistance 198. A wire 199 connects the wire 190 to a resistance 200 and the wire 182.

The output side of the transformer or amplifier 172 is grounded at 202 and is connected by the wire 203 with a relay-operated switch 204.

The transformer 172, the preliminary and the terminal valves, the choke coils, and other parts associated therewith, form a unit which may be of standard construction and which is situated in the bottom chamber 119 of the casing 100 (Figures 1 and 2).

However, the switches 181 and 204 and other devices associated therewith, are situated in the second chamber 113 of the casing 100.

The chamber 113 also contains a relay 206 while another relay 205 is situated in the battery space 114.

The main switch 207 of the device is connected by a wire 208 with the relay 205 and is operated by the switch 389 (Figure 1). The switch 207 is illustrated in detail in Figs. 41 to 43. The wire 209 (Figure 5) connects the relay 205 with the relay 206. The switch 207 is shunted by a condenser 210 and is connected by a wire 211 with the choke coil 165 and the wire 166. The wire 212 connects the relay 206 with the wires 158 and 179.

The sound box 106 which is indicated diagrammatically in Figure 5, is connected by a wire 213 to a switch 214 which is also operated by the relay 206. The opposite side of the sound box 106 is grounded by the wire 215.

One side of the potentiometer 108 is grounded at 217 while its opposite side is connected to a transformer 218. The movable contact 219 of the potentiometer 108 is connected by the wire 220 with the switch 181. As already described, the wire 182 connected to the switch 181 leads to the input side of the transformer 172. The third wire 221 of the switch 181 is connected to the movable contact of a potentiometer 109. One end of the potentiometer 109 is grounded at 224 while its opposite end is connected by the wire 223 with the switch 214.

One side of the transformer 218 is connected by a wire 252 to the microphone 111, which is indicated diagrammatically in Figure 5. Both the primary and the secondary sides of the transformer 218 are grounded at 225. The transformer 218 is also connected to the potentiometer 108.

A wire 226 connects the transformer 218 and the potentiometer 108 to the connection 132 which is used for connecting the device with a radio apparatus or a transformer. The second contact of the connection 132 is grounded by the wire 228. The connection 132 is carried by the rear side of the section 113 of the casing 100.

The microphone 111 is connected by a wire 229 with the battery 115 which is connected by a wire 99 to a grounded switch 231 operated by the relay 206 along with the switches 181, 214, and 204.

The battery 115 is also connected to a rectifier 232 which is connected by means of the wires 233 and 234 to a transformer 235. The primary side of the transformer 235 is connected by a wire 236 to a switch 237 which is operated by the relay 205. The switch 237 is connected to a network connection.

One of the wires 238 of the switch 204 is connected to the loudspeaker 103, the opposite side of which is grounded at 240.

The sound box 106 is also connected to a transformer 241, two sides of which are grounded at 242 and 243. A wire 244 connects the transformer 241 with the wire 213. Another wire 245 connects the transformer 241 with one of the contacts of the switch 204. A wire 246 connects the wire 245 with the rectifier 247 which is grounded at 248 and is connected by the wires 249 and 250 to a milliampere-meter 110 which is carried by the front portion of the casing 100.

In order to place the device in position for recording, the main switch 207 is switched on manually so that it interconnects the wires 208 and 211. Then an electrical current will flow from the current supply terminals 128 and through the transformer 151 and the wire 158. The current will flow through the wire 212 which is connected with the wire 158, and then will flow through the relay 206, the wire 209 and the relay 205. The current will flow through the wires 208 and 211 and the wire 166 to the output side of the rectifying valve 121.

The two relays 205 and 206 will be energized and will operate the various switches. The relay 205 will open the circuit, which is usually closed by the switch 237. The relay 206 will move the switches 181, 214, 204 and 231 downwardly, in relation to the positions in which they are illustrated in Figure 5.

In the energized positions, an electrical current will flow through the wire 182, the switch 181, the wire 220, the potentiometer 108 and the transformer 218 toward the microphone 111, the wire 229, the battery 115 and the switch 231, being grounded at 251.

The current will flow through the conductors 252 to the primary side of the transformer 218. Thus the microphone circuit is closed by the ground to which the primary side of the transformer 218 is also connected.

As far as the secondary side of the transformer is concerned, current will flow through the potentiometer 108, the switch 181, the wire 182, the wires 199, 158, 177, 167, and 171, into the amplifier transformer 172. Thence the current will flow through the wire 203 and the switch 204 to the primary side of the transformer 241, the secondary side of which is connected by the wire 244 to the recording portion of the sound box 106. As already mentioned, the transformer 241 is grounded on both sides at 242 and 243.

The vibrations caused by the microphone are transformed into an electrical current flowing through the wire 246, the rectifier 247, and the wire 249 to the milliamperemeter 110, which indicates the operation of the sound box or pickup 106.

Since the relay 205 opens the switch 237, the charging process is interrupted during the recording.

In order to change the machine from the recording position to the reproducing position, the switch 389 is actuated and the switch 207 is moved into the position shown in Figure 5. Then the relays 205 and 206 are deenergized and the switches 237, 181, 214, 204 and 231 resume the position shown in Figure 5.

Then the electrical current will flow through the sound box 106 and the wire 213 to the switch 214 and thence through the wire 223 to the potentiometer 109, the wire 221, the switch 181, and the wire 182 toward the transformer 172.

From the secondary side of the transformer 172, the current will flow through the wire 203, the switch 204, and the wire 238 to the loudspeaker 103. As already mentioned, the loudspeaker is grounded at 240. The transformer 241 is completely switched off at the time of reproduction.

The switch 237 remains in the closed position shown in Figure 5 due to the deenergization of the relay 205, so that the battery 115 may be charged by means of the rectifier 232.

The rectifier 232 is connected by means of wires 259 and 260 with two condensers 118 and 261, a choke coil 262, a switch 263, the battery 115, and a second battery 264. By the use of the switch 263, the two batteries 115 and 264 may be alternately connected to the circuit.

A filter chain of this type, which is attached to a transformer may be used to charge one of these batteries during recording; it is necessary, however, that the switch 237 remain closed. The batteries 115 and 264 operate on the buffer principle.

If the microphone 111 requires no voltage, then the battery 115 and the corresponding part of the rectifier system may be omitted.

The driving means for the turntable 105 and a device for varying the speed of rotation of the turntable are illustrated in Figures 6 to 9 and 12 of the drawings.

The motor 270 (Figure 6) which drives the turntable 105 is provided with an armature 271 which is movable in the direction of its central axis along with the armature shaft 272. The conical pulleys 273 and 274 are firmly fixed to the upper projecting end of the armature shaft 272.

The lower end of the shaft 272 also projects beyond the motor 270 and is provided with a thrust bearing 275 which is actuated by the lever 276.

The lever 276 is rotatably mounted upon a pivot 277 carried by a projection 278 which is supported by the casing of the motor 270. One end of the lever 276 is connected with the thrust bearing 275 by the pin 279. The opposite free end 270 of the lever 276 rests upon a cam 281. The cam 281 is mounted upon a shaft 282 and is rotatable therewith. A knob 283 projects beyond a wall of the casing 100 and is connected with the shaft 282 so that when the knob 283 is turned by hand the end 280 of the lever 276 will be raised or lowered, due to the rotation of the cam 281 with which the lever 276 is in engagement.

The lever 276 transmits its movement to the thrust bearing 275, thus moving the shaft 272 along with its pulleys 273 and 274 in the direction of its longitudinal axis.

A large horizontally disposed conical disc 285 is situated above the motor 270 and is carried by a movable plate 315 engaged by a spring 316 (Figure 9). A small friction disc 286 (Figure 6) is firmly connected by the sleeve 287 with the disc 285.

The friction disc 286 presses against the rim 288 of the turntable 105, while either the disc 286a or the disc 285 may be in frictional engagement with one of the pulleys 273 or 274. The speed of rotation of the turntable 105 may be varied with reference to the speed of rotation of the motor 270 by varying the relative positions of the pulleys and the friction discs. The lever 287a which is operated by the knob 98 (Figure 1) and which is used for replacing the disc 285 by the disc 286a in its engagement with the pulleys 273 or 274, is described in detail in my copending patent application, Serial No. 9,811, filed March 7, 1935.

If the knob 283 is turned in such manner that the shaft 272 and the pulleys 273 and 274 are moved upward in the direction of the arrow 289 in Figure 6, then the spring 316 (Figure 9) will move the plate 315 and the frictional disc 285 toward the conical pulley 274 until the disc 285 will engage a smaller circumference of the pulley 274, so that the speed of rotation of the disc 285 will be reduced. This reduction of speed will be transmitted by the other frictional disc 286 to the rim 288 of the turntable 105, so that the speed of rotation of the turntable will be correspondingly reduced.

Figures 9 to 20 show the turntable drive and means for stopping the turntable. A worm 290 constitutes a part of a pulley 273 (Figure 6) and meshes with a worm gear 291, which is rotatable along with a shaft 292. The shaft 292 extends through a braking yoke 293 which is rotatable around a pivot 294 mounted upon the plate 295. A disc 296 is firmly mounted upon the shaft 292 between the arms of the yoke 293.

As shown in greater detail in Figure 15 of the drawings, the disc 296 is provided with two diametrically opposed notches 297 and 298.

As shown in Figure 9, the yoke 293 is engaged by a spring 299, so that the yoke 293, the worm gear 291, and the notched disc 296 are subjected to pressure.

The movement of the yoke 293 with the worm gear 291 and the notched disc 296 is limited by a stop pin 300 and an abutting plate 301.

When one of the notches 297 or 298 of the disc 296 (Figure 15) is situated opposite the abutting member 301, the spring 299 will move that notch into the edge of the member 301, thus moving the yoke 293 and interrupting the engagement between the worm 290 and the worm gear 291.

A releasing lever 302 is connected by a bolt 303 with the yoke 293. A cam-like plate 304 is screwed upon the opposite end of the lever 302, and is adjustable in relation to the supporting end of that lever.

The cam plate 304 is used for operating the releasing lever 302 through the intermediary of an electromagnet, as will be described in detail hereinafter.

The turntable 105 is always connected with its driving means and disconnected therefrom while the motor 270 (Figure 6) is running, since the first step in operating the machine is to press the button 97 (Figure 1) which will turn on the motor 270. At that time the brake lever 339 is in its "on" position and the frictional drive is in its "off" position, shown in Figure 12.

The worm 290 rotates along with the motor so that as soon as the worm gear 291 is brought into engagement with the worm 290, the disc 296 is rotated along with the shaft 292.

A ring 305 is mounted upon the shaft 292 and is provided with an eccentrically mounted connecting rod 306. A pivot 307 connects the rod 306 with a second connecting rod 308 which is mounted upon an angular support 309. The support 309 is connected by a bolt 310 with one end of a lever 311, the opposite end of which is pivotally mounted upon a pin 312.

The lever 311 is provided with a cutout portion 313 which is in engagement with a frictional roller 314 mounted upon the plate 315 connected to a spring 316.

The plate 315 carries the frictional discs 285, 286, and 286a. Therefore, by the movement of the plate 315, the disc 286 is moved in and out of engagement with the rim 288 of the turntable 105.

The electromagnetic device for connecting the turntable 105 with the drive and for interrupting this connection comprises a magnetic coil or solenoid 318 and another magnetic coil 319 (Figure 9). A magnetic core 320 is carried upon a rod 321 which is provided with an insulating ring 322.

Two contacting springs 323 and 324 engage the contacts 325 and 326, respectively.

The lower end of the bolt 321 carries a connecting link 330. A bolt 331 having the form of a pin is carried by the link 330 and is in engagement with the forked end of a lever or link 332, which is mounted upon a shaft 333. A cam 334 is firmly connected with the shaft 333 and is provided with a bolt 335. The releasing lever 302 is situated above the link 332 and the cam 334.

The bolt 335 extends through a slot formed in the releasing lever 302, so that in the course of the movement of the magnetic core 320 the bolt 335 engages the cam 304, with the result that the movement of the magnetic core 320 is transmitted to the releasing lever 302 which is swung against the action of the spring 299 in order to bring the worm gear 291 into engagement with the worm 290, or to move it out of engagement.

Figure 10 shows a spring 336 provided with two upturned end portions 337 and 338. These bent ends of the spring 336 constitute stops for the insulating ring 322 and prevent the back sliding of the ring 322.

The braking device for the turntable 105 which is used to eliminate the flywheel effect, includes a brake lever 339 which is engaged by a spring 340. One end 341 of the lever 339 is pressed against a cam 342 by the spring 340.

As shown in Figures 18 and 20, the cam 342 together with the ring 305 is firmly connected to the shaft 292. The cam 342 rotates along with the shaft 292. The frictional discs 285, 286, and 286a are moved into an inoperative position at the same time when the brake lever 339 along with its end portion 341 is moved into the "on" position shown in Figures 12, 14 and 17. In that position the felt 343 of the brake lever 339 is pressed against the rim of the turntable 105 by means of the spring 340.

Figures 9 and 19 show the brake lever 339 in its "off" or inoperative position. The brake lever 339 occupies this position when the friction discs 285 and 286 are in engagement with the pulley 274 and the turntable 105, respectively.

In order to start the machine, the operator presses the button 97 (Figure 1) which will close the circuit of the motor 270 (Figure 6) so that the motor will rotate. However, at this time the brake lever 339 is in engagement with the turntable 105 and the friction wheel 286 is out of engagement with the turntable. This position is shown in Figures 12, 13, 14, 17 and 18 of the drawings. In this position, the worm 290 is out of engagement with the worm gear 291.

Figure 12:
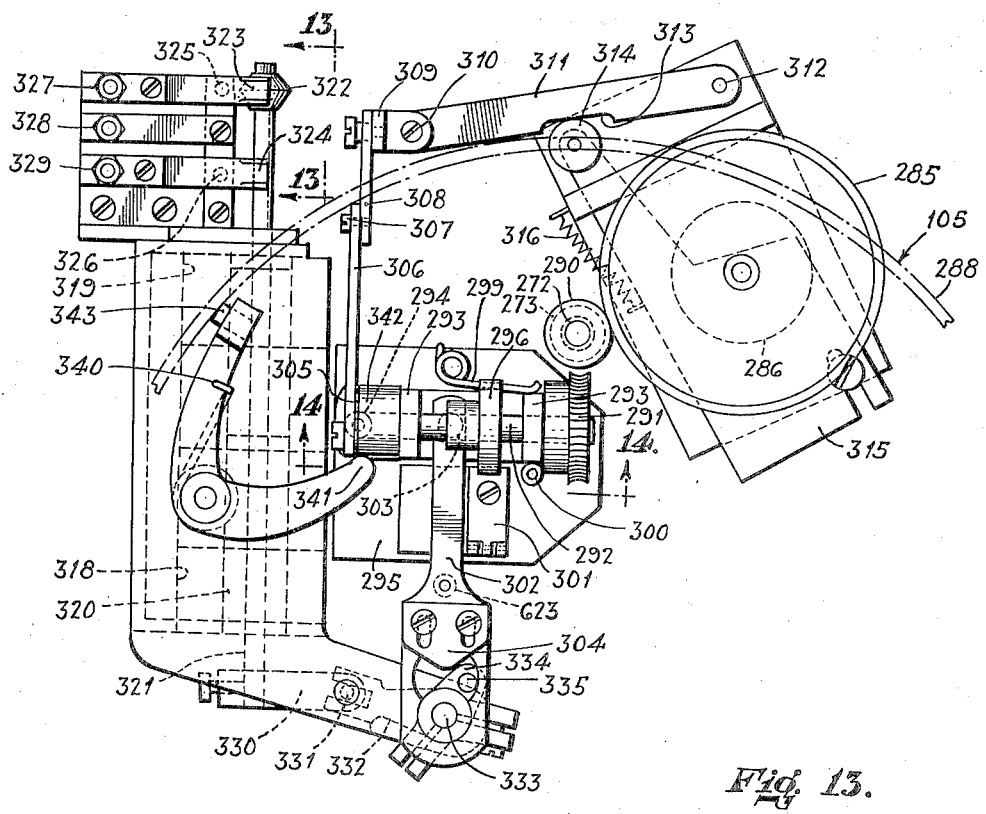
Figure 12 is similar to Figure 9 and shows the device in the disengaged position.
Figure 14:
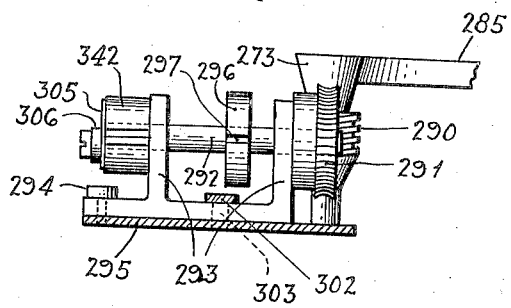
Figure 14 is a section along the line 14—14 of Figure 12.
Figure 13:
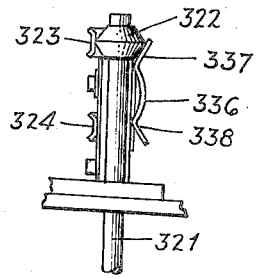
Figure 13 is similar to Figure 10 and shows the change-over switch in the disengaged position.

Then the operator presses the foot switch 124 (Figure 1) thereby closing a circuit which includes the contact spring 324 and the contact 326 (Fig. 12). These contacts are connected with the magnetic coil 318 which will be energized and which will attract the magnetic core 320. The core 320 and its rod 321 will move downward from the position shown in Figure 12 to the position shown in Figure 9. The links 330 and 332 will swing the members 332 and 334 causing the pin 335 to press against the cam plate 304 and to swing the lever 302 and the yoke 293 around the pivot 294. The shaft 292 and the worm gear 291 will be moved also and the worm gear 291 will engage the worm 290. The notched disc 296 which was locked by the locking plate 301, will be released in spite of the pressure of the spring 299.

The insulating ring 322 mounted upon the rod 321 will slide off the contact spring 323 and will engage the contact spring 324, as shown in Figure 9. Then the coil 318 will be deenergized and the coil 319 will be energized and will exert a force of attraction upon the magnetic core 320.

In the course of these changes the worm gear 291 which is now in engagement with the driving worm 290 has completed one half of a revolution. The cam roller 342 was rotating along with the worm gear 291. A projecting surface of this cam pressed against the end 341 of the brake lever 339, and moved the brake lever 339 from the "on" position shown in Figure 12 to the "off" position shown in Figure 9.

The ring 305 rotates along with the cam roller 342 and the worm gear 291. This rotation is transmitted by the links 306 and 308 to the lever 311 which swings about its pivot 312. The roller 314 rolls over the cam surface 313 of the lever 311 and moves the plate 315 from the position shown in Figure 12 to the position shown in Figure 9, bringing the frictional disc 286 into engagement with the turntable 105. Thus the releasing of the brake and the frictional engagement of the turntable take place simultaneously.

At the time when the worm gear 291 and the notched disc 293 have completed one half of a revolution, the pressure of the pin 335 against the cam plate 304 has ceased, due to the demagnetization of the coil 319. Therefore, the spring 299 exerts its full pressure against the yoke 293 and as soon as the notch 297 is moved in front of the plate 301, the spring 299 will swing the yoke 293 toward the plate 301, so that an edge of the plate 301 will penetrate that notch and will lock the disc 296. In this locked position there is no engagement between the worm gear 291 and the worm 290.

Several means may be used for turning on and off the electric current of the machine. For example, a switch may be operated by hand by pressing a switch button arranged upon the speaking tube of the machine (not shown). On the other hand, the switch in the form of a press button may be attached to a dictating machine or to the edge of a table, or it may be operated by the foot control 124 shown in Figure 1. All these controls may operate at any given distance from the machine and may be connected by an electrical cable 350 with the plug 128 (Figures 1 and 2).

A foot control 124 is provided with a foundation plate 355 and a movable button 356. Any suitable spring arrangement not shown in the drawings may be used for moving the button 356 upward as soon as the foot pressure is released.

Figures 21 to 32 show the sound box 106 and a device for actuating it. The lower part or base 359 of the sound box carrier 107 is disposed on guide shafts 360 and 361 and is situated within the inclined front portion 138 of the machine cover. A feed screw 362 carries the base 359 and is used for moving the sound box carrier 107 over the record. The base 359 extends through the opening 146 provided in the cover portion 138.

The sound box 106 provided on the front part of the sound box carrier 107, carries a recording stylus 363 and a reproducing stylus 364.

The styli 363 and 364 are firmly or interchangeably mounted in a support 365 which is suspended from the sound box 106 by means of a shaft 366. A set screw 367 is used to secure this recording and reproducing tool to the sound box.

A hollow box or sleeve 368 is situated within the sound box carrier 107, the front end of this sleeve having the form of an open head 369. The opposite end of the sleeve 368 is provided with a groove 370 which contains a bolt 371. The bolt 371 is screwed sidewise into the carrier 107. Due to this arrangement, the sleeve 368 may turn within certain limits, but is prevented from moving in its axial direction.

The underside of the carriage 107 has a recess 372, and a pin 373 carried by the sleeve 368 projects into this recess.

A ball joint 374 is situated within the sleeve 368 and is mounted upon a pin 375. The shaft 376 which carries the sound box 106 is also connected with the pin 375.

The web 377 of the sound box 106 carries a rotatable roller 378 which is mounted upon a pin 379. The web 377 also carries an adjustable guide pin 380.

A guide member 381 is attached to the underside of the carriage 107 and carries a control slide 382 which is movably mounted upon the guide 381.

The control guide 382 is shown in three different positions in Figures 24, 28 and 32 of the drawings, and it carries a plate 383 which faces the sleeve 368 and is attached to the guide by the bolts 383a. The plate 383 has a curved slot 384 and guide pin 373 carried by the sleeve 368 extends through this slot 384. The slot 384 continues in the form of a slit 385, so that one side of the plate 383 acts as a spring which holds the guide pin 373 when the slide 382 is in its foremost position.

The front part of the slide 382 which projects beyond the support 381 is provided with a recessed portion 386 and a slot 387 (Figure 21). The recessed portion 386 is so shaped that it receives the roller 378 while the guide pin 380 is entering the slot 387.

The sound box carrier 107 carries a shaft 388 one end of which is connected with the control lever or change-over switch 389. Another lever 390 is situated within the carriage 107 and is mounted upon the shaft 388. The slide 382 is connected with the lever 390 by means of the link 391.

Furthermore, the shaft 388 is firmly connected with the cam 392 which is used to actuate a cushioned control slide 393. The slide 393 is guided in a slot formed in the base 359 of the carriage and is covered by a plate 394.

The end 395 of the control slide 393 presses against an end of a pin 396 carrying the nut 397. The nut 397, the pin 396, and the control slide 393 are subjected to pressure by a spring 398, which tends to press the nut 397 against the feed screw 362, thereby causing the screw 362 to drive the carriage 107. The member 397 is movable in relation to the feed screw 362 and is carried by a lever 399.

As shown in Figures 23, 27 and 31, the lever 399 is rotatably mounted upon a pin 400 and is maintained in place by a bolt 401 situated in an oblong opening 402, so that the lever 399 and the nut 397 are movable within predetermined limits.

When the change-over switch 389 is in its lowest position, which is shown in Figure 25 of the drawings, the machine is set for recording. Then the described elements of the machine are in positions shown in Figures 25 to 28.

The rotatable roller 378 is then situated within the recess 387 of the slide 382, so that the sound box 106 may drop downwards and place the recording stylus 363 upon the record 140.

The adjusting screw 403 limits the movement of the sound box 106 and extends through an opening provided in the projection 369 situated at the top of the sleeve 368. The adjusting screw 403 is screwed into the connecting tube 405 of the sound box 106.

Due to the provision of the guide pin 373 in the slot 384, the sleeve 368 will be turned within the carrier 107, causing the sound box 106 to occupy the slanting position which is shown in Figure 26. At the same time, the slide 382 holds the guide pin 380 within the groove 387 so that the sound box 106 cannot carry out any side movements which may interfere with the recording.

At the same time, the cam 392 is situated at one side, so that the spring 398 can press the control slide 393 upward and move the nut 397 into engagement with the feed screw 362.

In order to change the machine from the recording position to the reproducing position, it is first necessary to move the change-over switch 389 from the recording position, shown in Figure 25, to the neutral position, shown in Figure 21.

The lever 390 rotates along with the change over switch 389 and pulls the slide 382 to the withdrawn position shown in Figure 21. Then the roller 378 is moved out of engagement with the recessed portion 386 and slides over the raised portion 387a of the slide 382, with the result that the sound box 106 is raised from the record 140.

Due to the withdrawal of the slide 382, the curved guide slot 384 is moved in relation to the guide pin 373, and turns the sleeve 368 within the sound box carrier 107, thus moving the sound box 106 into the position shown in Figure 22, The cam 392 is also turned by the change over switch 389 and presses the slide 393 downwards. Due to this downward movement of the slide 393, the pin 396 which carries the nut 397 is also moved downward, so that the nut 397 is moved out of engagement with the feed screw 362 and the sound box carrier 107 is stopped.

If now the operator continues to move the change over switch 389 in the same direction, the machine will be brought into the listening or reproducing position, shown in Figures 29 to 32. In this position, the roller 378 is completely released by the slide 382. As shown in Figure 30, the sound box 106 is placed again upon the record 140. However, it is the reproducing stylus 364 which now engages the grooves of the record. This turning of the sound box 106 is caused by the guide groove 384 which compels the sleeve 368 to turn.

Figures 33 to 38 show a catch or slide 406 for holding the change over switch 389. The slide 406 is provided with a knob 407 which is located upon one end of the slide 406. The opposite end of the slide has a notch 408.

The slide 406 is used to maintain the change over switch 389 in its three different positions, namely, the recording position (Figure 35), the listening or reproducing position (Figure 37), and the neutral position (Figure 33).

For that purpose, a spring 409, which is situated between the carrier 107 and the slide 406, is provided with a ridge 410, which cooperates with grooves 411 provided upon the inner surface of the slide 406. A spring 412 presses one of the grooves 411 into the ridge 410 when the slide 406 is in the proper position, thus maintaining the slide 406 in that position.

Figure 35 shows the retaining slide 406 in the unlocked position, in which the change over switch 389 may be swung in all directions.

In the position shown in Figure 37, the retaining slide 406 is in a half-locked position, in which the switch 389 can move only upwards or downwards as far as its central neutral position.

This is caused by the cushioning pin 414 carried by the change over switch 389, which is stopped by a projection 415 provided upon the retaining slide 406.

In the position shown in Figure 33, the retaining slide 406 is situated in its extreme end position in which the cushioning pin 414 is enclosed and held by the two projections 415 and 416 of the retaining slide 406. The switch 389 should be in this neutral position, when the machine is not being operated.

The electric circuit control by means of which all circuits of the machine may be controlled at the time when the change over switch 389 is moved from the recording position to the neutral position and from the neutral position to the reproducing or listening position, and vice versa, is illustrated in Figures 39 to 43 of the drawings. The circuits are switched on and off at the same time when the sound box 106 is actuated.

The electric switch control is situated upon an extension 420 of the base 359 of the carrier 107. A switch board 421 consisting of an insulating material is attached to the end portion 420 by the bolts 422 and 423. A switch plate 424 is rotatably mounted upon a bolt 425 and is held by a nut 426 upon that bolt.

The rotatable switching member 424 carries the connecting plates 427, 428, 428a, 429, and 430, shown in Figures 41 to 43.

As has already been described, the slide 393, which is movable within a groove formed in the member 359, is actuated by a cam 392 which is rotatable along with the main change over switch 389. The slide 393 is adapted to engage a bolt 431 which is connected to or in engagement with a side of the switching plate 424. The plate 424 is pressed against the slide 393 by means of a spring 432.

The plate 421 has eight circuit contacts provided on the lower edge thereof, which are adapted to be connected electrically with the connecting plates carried by the plate 424. Of these eight connections, the terminals 433 and 434 are those for the loudspeaker 103 (Figure 1). The terminals 435 and 436 lead to the input terminals 447 and 447a of the amplifying unit (Fig. 40). The terminals 437 and 438 lead to the microphone 111 and the battery 115 (Figure 1), while the terminals 439 and 440 lead to the output terminals 444 and 444a of the amplifying unit (Figure 40). The amplifying unit, which includes the tubes and the transformer 172 is shown in greater detail in Figure 5 of the drawings.

Figure 40 is a partial wiring diagram illustrating some of the connections shown in Figure 5 and the function of the contacting plates 427 and 430 in relation to these connections.

The switching operations which are carried out when the change over switch 389 is actuated are as follows:

When the switch is moved to the recording position, shown in Figure 41, the cam 392 presses the slide 393 downwards and the bolt 431 moves within a recess formed in the base 359 of the carrier 107 and presses against the switch plate 424 which is under the tension of the spring 432. Various connections are then made by the contact plates 427 to 430, which are carried by the plate 424. This recording position is shown in the diagram of Figure 40.

The contacts 437 and 438 will be electrically connected by the contacting plate 428a, so that the microphone circuit will be closed and the current will flow through the potentiometer 108 for the purpose of amplification. The amplifier current will flow from the output terminals 447 and 447a of the amplifying unit to the contacts 440 and 439, connected to the sound box 106, due to the connection made by the contact plates 428 and 429. The electrical current flowing to the sound box 106 will pass through the terminals 448 and 449 and thence through the wires 450 and 451 leading to the sound box 106. Suitable means (not shown) may be provided to disconnect the circuit when the sound box 106 is removed.

When the switch 389 is moved to the neutral or "off" position, shown in Figure 42, all the circuit connections are interrupted and the slide 393 is pressed upward by the plate 424 under the action of the spring 432. Then the contact plates 427 to 430 do not interconnect any terminals. As already described, this movement of the switch 389 at the same time raises the sound box 106 from the surface of the record 140 and disengages the nut 397 from the feed screw 362.

In the position shown in Figure 43, the switch 389 is in its reproducing position, in which the reproducing stylus 364 engages the surface of the disc 140. The vibrations of the stylus 364 are transformed in the sound box 106 into an electrical current which flows through the wires 450 and 451 to the terminals 448 and 449.

Thence the electrical current flows through the terminals 440 and 439 (Figure 40) and the contact plates 428 and 429 (Figure 43) into the terminals 435 and 436. Thence the electrical current passes through the potentiometer 109 and is amplified in the amplifying unit. At the same time, the terminals 460 and 461 (Figure 40) leading to the loudspeaker 103 or to ear phones are connected to the circuit of the amplifying unit by the contact plates 427 and 430.

In the reproducing position, the nut 397 again engages the feed screw 362. The amplified current is indicated upon the instrument 110, which operates then as a voltmeter and which is connected in parallel with the amplifying unit.

The voltmeter in the course of the recording shows the extent of the amplitudes by the movements of its pointer. Thus it is easily possible to control the volume of the sound in the course of the recording.

In the course of reproduction, the voltmeter operates in a similar manner, in that the oscillations inscribed upon a record 140 appear as the oscillations of the pointer of the voltmeter and the strength of the groove inscriptions is indicated by the amplitude of these oscillations.

As already stated, the amplified current passes through the output terminals 447 and 447a of the amplifying unit and the terminals 440 and 439, as well as the terminals 433 and 434.

Consequently, the machine operates as follows:

When the change over switch is moved to the recording position, the sound box carrier is connected to its drive and the recording stylus is placed upon the record. At the same time, the circuit control is actuated to connect the circuit of a source of electrical energy with the microphone and also to connect the microphone with the amplifier and the sound box.

When the change over switch is moved to the neutral or "off" position, the connection between the sound box carrier and its drive is interrupted and the styli are raised from the record. At the same time, the circuit control interrupts all the electrical connections.

When the change over switch is moved to the reproducing or listening position, the sound box carrier is connected to its drive and the reproducing stylus is placed upon the record. At the same time, the circuit control is actuated to connect the sound box electrically with an amplifier and a loudspeaker or an earphone.

This arrangement may be used as a substitute for the switch 207 shown in Figure 5, or may be used in combination with that switch.

Figures 44 to 58 illustrate the back spacer, or the return movement mechanism of the machine.

This device comprises two press buttons 465 situated on the sides of the front portion 138 of the cover plate 137 and movably mounted by means of guide rods or shafts 466 in a sleeve 467. Each of the guide rods 467 is connected with a separate swinging lever 468 by a pivot 469.

Both levers 468 have recesses 470 at their front ends. A rod 471 has suitable bearing end portions 472a extending through these cutout portions 470. The lower edge of the rod 471 is provided with teeth 472. The rod 471 is guided by rods 473, which are situated close to the switching levers 468. Therefore, when one of the buttons 465 is pressed downward, the device carries out a movement in parallel planes.

A pawl 474 co-operates with the teeth 472 and is mounted upon a pivot 475a of the carriage.

A lever 475 has an end portion which contacts the flat edge of the rod 471. The lever 475 is mounted upon a pivot 476 of the carriage.

As shown in Figures 57 and 58, the upper side of the lever 475 is provided with an angular member 477 extending over the end of a bolt 478 mounted in the driving nut member 397 (Fig. 58).

The spring 398 which engages the nut member 397 also presses the lever 475 upward continually.

The original inoperative position of the described construction is shown in Figures 51 and 50. The change-over switch 389 is in the reproducing position, so that a record 140 can be played. The nut member 397 is pressed against the spindle 362, so that when the drive is switched on, the sound box carrier 107 will move over the record 140.

If a part of the record is to be repeated, one of the buttons 465 is pressed downward into the position shown in Figures 55 to 58. Then the rod 471 is shifted downwardly in a direction parallel to itself. The rod strikes the end of the lever 475, which is swung counterclockwise, as shown in Figure 51. In the course of this movement, the lever 475, by means of its angle 477 and the pin 478, shifts downwardly the nut member 397, so that the movement of the sound box carrier 107 is interrupted. In the course of the further downward movement of the rod 471, its teeth 472 engage the end of the pawl 474 which is also pressed downwardly, and due to this leverage action, the sound box carrier 107 is shifted backwards to a certain extent upon the guides 360 and 361.

As soon as the pressure upon the button 465 is released, springs move the various parts back to their original positions. If a button 465 is pressed downwardly again, the sound box carrier 107 moves back again to the same extent.

If during the return movement, which is carried out transversely to the grooves of the record 140, the reproducing stylus 364 should remain in its operative position, it could injure the record, and thus create noises in the course of the reproduction. In order to eliminate this danger, the reproducing stylus 364 is raised from the record 140 in the course of the return movement by means of a two-armed lever 480 (Figure 56). The lever 480 is mounted upon a pivot 481 carried by the sound box carrier 107. A pin 482 carried by the lever 480 extends under the rod 471.

The upper end of the lever 480 has an inclined surface 483 which engages a pin 484 carried by a lever 485. The lever 485 is swingably mounted upon a pivot 486 (Fig. 55) and has an upper end which by means of a pivot 487 engages the movable rod 488. The rod 488 is movable in the horizontal direction and is mounted in the sound box carrier 107. The front end of the rod 488 is provided with an angularly bent steering lever 489, which has a front cam-like end co-operating with a roller 490 mounted upon the sound box 106.

When the reproducing stylus 364 is situated in its operative position, as is shown in Figure 53, then the clockwise swinging of the lever 485 causes the rod 488 to move forward compressing the spring 491, so that the steering rod 489 will engage the roller 490 of the sound box 106. The reproducing stylus 364 is then raised from the record 140.

If the reproducing stylus 364 is to be shifted backwards in the course of the reproduction, the button 465 is pressed downward in the described manner. Then the button 465 is moved from the position shown in Figure 53 to the position shown in Figure 56. This causes a downward movement of the rod 471, and due to the engagement of the bolt 482, the lever 480 is rotated counterclockwise.

The lever 480, by means of its inclined surface 483, raises the pin 484 before the pawl 474 is brought into engagement with the teeth 472. The pin 484 turns the lever 485 and thus the sound box 106 is turned upward and the reproducing stylus 364 is raised from the record 140. Only then is the movement resumed by means of the pawl 474 and the teeth 472.

When the pressure upon a button 465 is released, the pin 484 is freed as soon as the sound box carrier 107 is brought to a stop and then the stylus 364 is again placed into one of the grooves of the record 140. Thus any damage to the grooves of the record is avoided.

However, a return movement would be much more damaging if it were carried out while the recording stylus 363 is in its operative position. Then the recording stylus may obliterate that which has been already inscribed. For that reason, the back spacing device must be so constructed that a return movement does not take place as long as the recording stylus 363 is in operation. A lever 492, which is shown in Figures 45, 46, 51, and 52, is provided for this purpose, said lever being mounted upon the sound box carrier 107 by means of a plate 493 and being swingable about a pivot 494.

A spring 494a tends to shift the lever 492 from the position shown in Figure 46 to the position shown in Figure 52. The end 495 of the lever 492, which is directed toward the machine, cooperates with a lever 496 constituting a part of the pawl 474, the lever 496 extending over the lever end 495, which is guided in a slot 497.

The pawl 474 is connected with the changeover switch 389.

Figure 48:
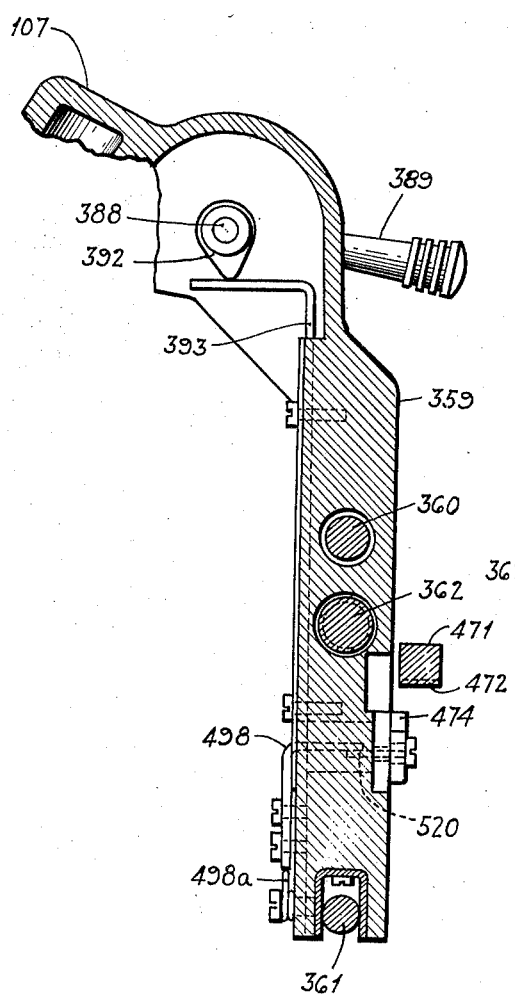
Figure 48 is a section through a part of the sound box carrier.
Figure 49:
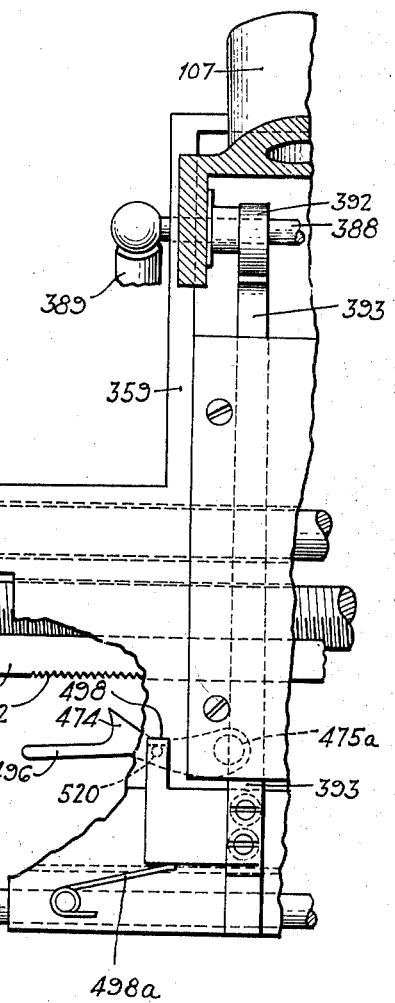
Figure 49 is a rear view of a part of the sound box carrier, shown in Fig. 48 partly in section.
Figure 78:
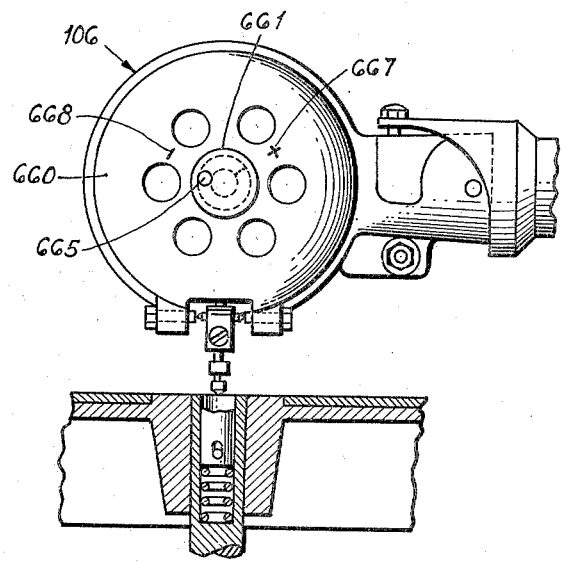
Figure 78 is a side view of a sound box at the time when the reproducing stylus engages the surface of a record.

As shown in Figures 49 and 48, the lower end of the guide 393 carries an angle 498 extending over a pin 520 which is mounted upon the pawl 474. The pressure spring 498a is used to provide an engagement between the cam 392 and the guide 393.

When the change-over switch 389 is situated in its reproducing position, the pin 520 is out of engagement with the member 498, so that the pawl 474 can move freely and cause the carrier 107 to carry out the return movement.

If, however, the change-over switch 389 is turned downwardly into the recording position, then the cam disc 392 is turned upwards and the guide 393 is moved downwardly compressing the spring 498a. The member 498 and the pin 520 shift the pawl 474 downwardly in the direction opposite to that of the action of the spring 498a. The lever 496 transmits this movement to the end 495 of the lever 492. The lever 492 swings clockwise from the position shown in Figure 50 to the position shown in Figure 44. In this position, the end of the lever 492 acts as a stop underneath the rod 471, so that the rod 471 cannot move downward anymore.

Then it is impossible anymore to press the button 465 downward and consequently the return movement device is switched off entirely.

Only when the change-over switch 389 is moved back into the reproducing position, the return movement of the device is freed again, in that by the raising of the pawl 474 the lever arm 496 frees the locking lever 492, so that the lever can move again in its operative position by the action of a spring.

Figures 59 to 61 of the drawings show a bell ringing device used to indicate to the user that the inscription of a record is about to be completed. The device comprises a plate 525 carried by the sound box carrier 107 and provided with a bolt 526. A cam lever 527 is rotatably mounted upon the bolt 526 and is provided with a hook 528 situated within an opening 529 provided in the plate 525. A spring 530 presses the hook 528 against the edge 531 of the opening 529.

The bell ringer situated in the path of the sound box carrier 107 comprises a lever 531 pivotally mounted upon a pin 532 and held by a spring 533. One end of the lever 531 carries the bell button 534, while the opposite end of the lever 531 carries a pin 535 which is situated in the path of the lever 527.

In the course of the movement of the carrier 107, the lever 527 will engage the pin 535 and will turn the lever 531, as shown in Figure 61. The compressed spring 533 will move the lever in the opposite direction as soon as during the further movement of the carrier 107 the lever 527 will move beyond the pin 535, thereby causing the bell to ring.

During the return movement of the carrier 107, the lever 527 will swing around the pivot 535 without turning the lever 531.

Figure 62 shows a recording and reproducing machine of a modified type. This machine comprises two sets of devices 500 and 550, each of which is similar to that shown in Figures 1 and 2 of the drawings. The devices are carried by a casing 501 which is provided with a door 502 and which contains the entire electric equipment.

Each of the devices 500 and 550 is provided with a foot switch 503 and 504, respectively, for starting and stopping the turntables 505 and 506. The positions of the recording and reproducing styli upon the discs are shown by the indicating devices 507 and 508.

A loudspeaker 509 and a microphone 510 are connected to the electrical equipment of the machine which is similar to the one already described. A conductor 511 carried by a side wall of the casing connects the microphone 510 with the electrical equipment of the machine.

By means of this machine it is possible to use, for example, the device 500 for making a record upon a disc and, after the latter has been completed, to change to the device 550 for continuing the recording upon the disc carried thereby. While one of the devices is in operation, the disc of the other device may be exchanged.

Figures 63 and 64 show a speed changing device for the turntable 105, which differs from the device shown in Figure 6 in that the change in speed is caused by the raising or lowering of friction discs 285, 286, and 560 along with the movable plate 315 supporting these discs. The driving motor 562 and its armature 563 remain immovable in this construction.

A plate 561 is carried by a rod 564 and supports the movable plate 315. The friction discs 285, 286 and 560 are wedged between the drive cones 273 and 274 by a spring not shown in the drawings and connected to the movable plate 315. The plate 561 is guided by a sliding bolt 565. The lower end 566 of the rod 564 rests upon a cam 280 connected by a shaft 282 with a knob 283. By turning the knob 283 along with its shaft 282 and the cam 280, the rod 564, the plate 561 and the movable plate 315 along with its frictional discs 285, 286 and 560 are raised or lowered, thus changing the speed of rotation of these discs which are maintained in engagement with the drive cones 273 and 274 by the spring pressing against the plate 105. Thus the speed of rotation of the turntable 315 is also varied.

Figures 65 and 66 show a different drive for the turntable 105, wherein two frictional discs 570 and 571 are used. The discs 570 and 571 are situated side by side and are of different size. As in the construction shown in Figure 63, the change in speed of the turntable 105 is caused by raising or lowering the bolt 564 which carries a plate 565 supporting an upper movable plate 315. The spring 316 connected with the plate 315 maintains the disc 570 in engagement with a drive cone 572, while the disc 571 is pressed against the rim of the turntable 105.

The construction shown in Figures 67 and 68 comprises a single frictional disc 580, one side of which is pressed against the drive cone 581 by a movable supporting plate 582 actuated by the spring 583. The opposite side of the disc 580 is in engagement with an inner rim 584 of a turntable 585. In this construction also, the speed of the turntable is changed by raising or lowering a rod 564 carrying a plate 565 which supports the movable plate 582.

Figures 69, 70, and 71 show a braking device for stopping the turntable 105 and electromagnetic engaging and disengaging means. The brake 590 carries a piece of felt 591 and is pressed against the turntable 105 by a spring 592. The lower end of the brake 590 is mounted upon a pin 593 which is carried by a plate 594. A roller 595 is rotatably mounted upon a switch lever 596.

The brake 590 also carries an adjusting screw 597 through the use of which the amount of pressure exerted by the brake 590 upon the turntable 105 may be adjusted.

A magnetic core 598 is carried by a guiding shaft 599 and is movable within magnetic coils 600 and 601. As shown in Figure 71, a portion of the core 598 has the form of a toothed rack 602. A pinion 603 meshing with the rack 602 is firmly connected with an insulating disc 604 which is beveled on one side.

Two pairs of contact springs 605 to 608 are situated on opposite sides of the disc 604 and are so placed that the contacts of one pair are out of engagement with each other when the beveled side of the disc 604 is moved close to them. Thus, due to the rotation of the disc 604, contacts of each pair are alternately brought into engagement one with the other.

The pinion 603 and the disc 604 are rotatable along with the shaft 609, which also carries a cam 610 provided with a pin 611.

A link 612 connects the pin 611 with a pin 613 carried by the switching lever 596. The pin 613 is also connected with the rod 614 of a plunger 615 movable within an air-pump cylinder 616. A set-screw 617 is used for regulating the intake and exhaust of the air pump cylinder 616.

The described electromagnetic coupling means and the brake operate as follows:

The contact springs 605 to 608 are electrically connected to a change-over switch. When this change-over switch is moved to an operative position, a circuit will be closed through that pair of contact springs which is in engagement with each other. Then either the coil 600 or the coil 601 will be energized and will attract the magnetic core 598. The core 598 will move toward the energized magnet along with the rack 602.

The movement of the rack 602 will be transmitted to the pinion 603. The pinion 603 will complete one-half of a revolution and at that time its beveled side will be brought opposite the engaged pair of contact springs. These springs will then move apart while the springs of the other pair will be brought into engagement. Then, due to the electrical connections between the contact springs 605 to 608 and the magnetic coils 600 and 601, the energized magnetic coil will be deenergized while the other magnetic coil will be energized. Any suitable means not shown in the drawings may be used for maintaining the core 598 in the described position until further movement of the change-over switch.

During the described one-half revolution of the pinion 603, the shaft 609 and the cam 610 are also rotated. The pin 611 will move the link 612 so that the lever 596 will be turned around its pivot 618. At the same time, the plunger 615 will be moved by the rod 614 within the cylinder 616 and will operate as an air brake to absorb the shock caused by the magnetic coupling.

In the course of the swinging movement of the lever 596, the roller 595 will engage the adjusting screw 597 and will press the screw 597 along with the brake lever 590 away from the turntable 105, thereby releasing the turntable and permitting its rotation by means of any suitable frictional wheels (not shown). These wheels establish a driving connection between the motor shaft and the turntable at the time when the brake lever 590 is released.

Figures 69 and 70 show the brake lever 590 in its "on" position, while the "off" position of the lever 596 is shown by broken lines in Figure 70.

When the device is switched off, the core 598 is released; it will be attracted by the magnetic coil 601 and will move toward that coil, thereby moving the lever 596 from the dotted line position to the full line position of Figure 70. The roller 595 will move away from the screw 597 and the spring 592 will return the brake lever 590 into the position shown in Figure 69. The friction discs will be moved to a disengaged position at the same time.

Figure 72 (Sheet 6 of the drawings) shows a Bowden thread control, comprising a plunger 620 which is operable by means of the spring 621 and the wire 622. The plunger 620 is used to actuate a pin 623 which is carried by the releasing lever 302 (Figure 9).

The control is attached to a wall of the casing 100 of the machine. When the knob of the Bowden thread control is actuated, the plunger 620 will strike the pin 623 carried by the lever 302 and thus actuate the lever against the pressure of the spring 299 (Fig. 9) in the same manner in which the lever 302 is actuated by the magnetic coils 318 and 319. In other respects this construction and its mode of operation are the same as those described.

The turntable 105 shown in Figures 74 and 73 of the drawings comprises a frame 630 which may be raised or lowered and which is articulated to the turntable 105 by a pin 631. The frame 630 is raised when a disc is to be placed upon the turntable, and is then lowered again so that it lies over the rim of the disc and keeps the disc flat upon the turntable 105.

The construction shown in Figures 76, 77, and 75 comprises a retaining ring 640 which may be raised and lowered in parallel planes. The ring 640 carries guiding bolts 641 which move in openings 642 provided in the turntable 643. Connecting rods 644 engage the bolts 641 and are carried by a sleeve 645 which is mounted upon the driving shaft 646 of the turntable. A forked lever 647 projects into an annular groove 648 provided in the sleeve 645. The lever 647 is pivoted at 649 and is actuated by a press button 650.

When the button 650 is pressed downward, the lever 647 swings upwards and raises the sleeve 645, the rods 644 and the frame 640, so that a disc or record may be inserted sidewise between the frame 640 and the turntable 643 and placed upon the turntable.

A spring 651 surrounding the shaft 646 is used for moving the sleeve 645 and the lever 647 back into their original positions. Then the ring 640 moves downward upon the disc and/or the turntable by its own weight.

Figures 78 to 81 of the drawings show a volume regulating device used to mute the sounds produced by the machine in the course of reproduction, when these sounds are too loud.

The sound box 106 is provided with a cover 660 carrying a set screw 661 which projects into the interior of the sound box and is adjustable within certain limits. The projecting end of the set screw 661 carries a piece of felt 662.

Figure 79:
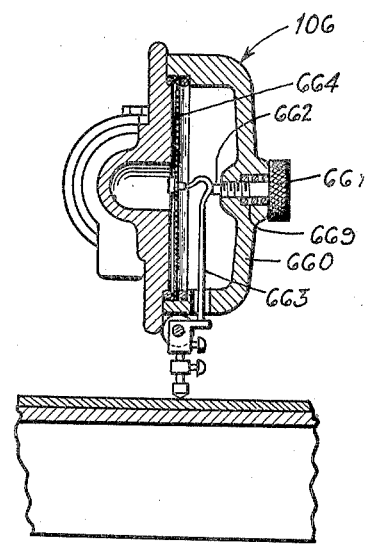
Figure 79 is a section through a sound box showing damping means for the mica diaphragm.

A swinging lever 663 situated within the sound box 106 is connected with the mica diaphragm 664. As shown in Figure 79, the felt 662 may be brought into engagement with the lever 663.

The outer surface of the set screw 661 is provided with an indicia or sign 665 in order to eliminate any possibility of confusion or error while setting the screw 661. The casing 660 carries a plus sign 667 and a minus sign 668.

Figure 80:
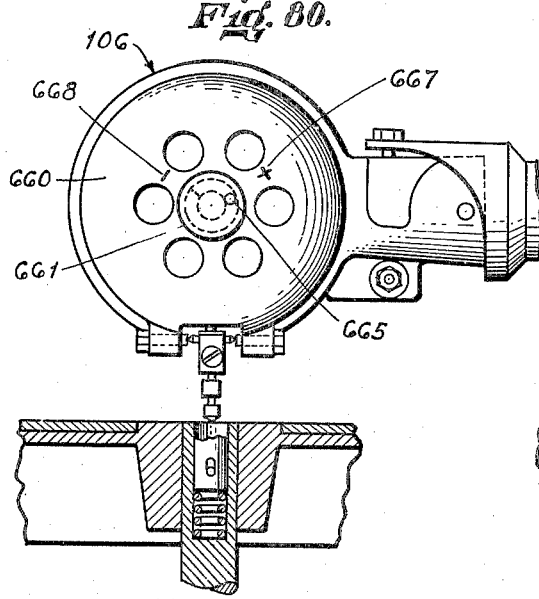
Figure 80 is a side view of a sound box.
Figure 81:
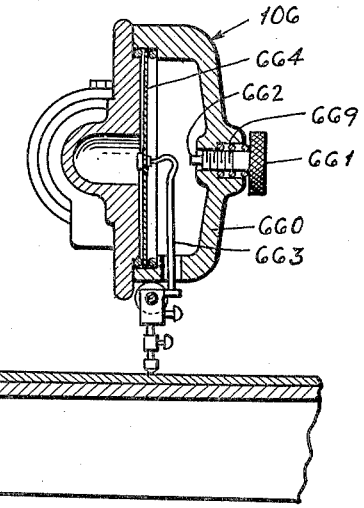
Figure 81 is similar to Figure 79 and shows the sound box wherein free vibrations of the mica diaphragm take place.

In the position shown in Figure 80, in which the sign 665 is situated opposite the plus sign 667, the felt 662 is removed from the lever 663, as shown in Figure 81. In this position the diaphragm 664 is free, so that the sounds are not muted.

When, however, the set screw 661 is turned until the sign 665 is situated opposite the minus sign 668 (Figure 78), the felt 662 presses against the lever 663 and the vibrations of the diaphragm 664 are damped.

The set screw 661 is enclosed by a spring 669 which prevents an accidental turning.

The sound volume may be regulated very minutely by turning the set screw 661 to a position in which the sign 665 is located in any desired position between the signs 667 and 668 provided upon the casing 660.

It is apparent that the specific illustrations shown above have been given by way of illustration and not by way of limitation, and that the structures above described are subject to wide variation and modification without departing from the scope or intent of the invention, all of which variations and modifications are to be included within the scope of the present invention.

What is claimed is:

1. In an electric recording and reproducing machine having a turntable and a conical driving pulley; frictional contacting means comprising two contact pulleys one of said contact pulleys engaging said conical pulley, the other one of said contact pulleys engaging said turntable, and means interconnecting the two contact pulleys to transmit the movement of said driving pulley to said turntable, spring tensioned means connected with the first-mentioned means for maintaining the contact pulleys in contact with said driving pulley and said turntable, respectively, and means providing a relative movement between said conical pulley and the first-mentioned means to vary the speed of movement of the said turntable.

2. In an electric recording and reproducing machine having a turntable and driving means; a braking lever engaging said turntable when the machine is at rest, means connected with the first-mentioned means for causing them to drive said turntable when the machine is operated, means connected with the second-mentioned means and said braking lever for substantially simultaneously actuating said braking lever and the second-mentioned means to move said braking lever and the second-mentioned means from a rest position to an operating position and vice versa, and means connected with the third-mentioned means for locking them after said braking lever and the second-mentioned lever have been actuated.

3. In a recording and reproducing machine having a turntable; a frame pivotally connected with said turntable for holding a record upon said turntable, and means connecting said frame with said turntable and permitting the raising of said frame from said turntable during the removal and insertion of a record.

4. In a recording and reproducing machine having a sound box carrier, a change-over switch carried by said sound box carrier, and a drive; means carried by said sound box carrier and engaging said drive to cause a movement of said sound box carrier, a slide movable upon said sound box carrier and adapted to engage said means to interrupt the engagement between said means and said drive and stop said sound box carrier, and means connected with said change-over switch and movable therewith to actuate said slide.

5. In a recording and reproducing machine having a sound box carrier, a change-over switch carried by said sound box carrier, and a sound box; a sleeve carried by said sound box carrier, a joint connecting said sound box with said sleeve, a slide operatively connected with said change-over switch, and means connected with said slide and engaging said sound box and said sleeve to move said sound box relatively to a record and to turn said sleeve simultaneously, whereby said sound box is moved to a neutral position, a recording position or a reproducing position.

6. In a recording and reproducing machine having a sound box carrier and a change-over switch swingably supported by said sound box carrier; a slide having a smaller projection and an adjacent larger projection; a pin carried by said change-over switch and movable therewith, and means connected with said slide and said sound box carrier for movably supporting said slide to move said larger projection into the path of said pin and to cause said projections to lock said pin.

7. In a recording and reproducing machine adapted to be connected with a source of electrical energy and having a change-over switch movable to a recording position and a neutral position; an amplifying circuit, a microphone circuit, a sound box circuit, and switching means operatively connected with said change-over switch and actuated thereby to connect said source of electrical energy with said microphone circuit and to connect said microphone circuit with said amplifying circuit and said sound box circuit in the recording position of said change-over switch, and to interrupt these connections in the neutral position of said change-over switch.

8. In a recording and reproducing machine having a plurality of electrical circuits, a sound box carrier and a change-over switch carried by said sound box carrier; a switchboard carried by said sound box carrier, a plurality of terminals connected with said electrical circuits and carried by said switchboard, a slide carried by said sound box carrier and movably connected with said change-over switch, a conducting plate movably carried by said sound box carrier, means connecting said conducting plate with said slide to move said conducting plate when said slide is moved by said change-over switch, and contact plates adapted to interengage said terminals and movably connected with said conducting plate.

9. In a recording and reproducing machine, in combination, a sound box carrier, a sound box connected with said sound box carrier, a change-over switch carried by said sound box carrier, means connecting said change-over switch with said sound box for moving said sound box, when said change-over switch is actuated, into a neutral position, a recording position and a reproducing position, a back spacing button, means connected with said sound box carrier for raising said sound box from a record when said button is actuated while said sound box is in the reproducing position and for locking said button when said sound box is in the recording position, and means connected with said button and said sound box carrier for causing a return movement of said sound box carrier when said button is actuated.

10. A recording and reproducing machine, comprising a sound box carrier, a sound box pivotally connected with said sound box carrier, a change-over switch carried by said sound box carrier, means connecting said change-over switch with said sound box for moving said sound box, when said change-over switch is actuated, into a neutral position, a recording position and a reproducing position, a back spacing button, a toothed rod carried by said sound box carrier, means connected with said button and said rod for causing a return movement of said sound box carrier when said button is actuated, a lever, means connected with said rod and said lever for actuating said lever, and means connected with said lever and contacting said sound box for raising the same.

11. A recording and reproducing machine, comprising a sound box carrier, a sound box pivotally connected with said sound box carrier, a change-over switch carried by said sound box carrier, means connecting said change-over switch with said sound box for moving said sound box, when said change-over switch is actuated, into a neutral position, a recording position and a reproducing position, a back spacing button, a pawl, means connecting said pawl with said button, a toothed rod engaging said pawl and connected with said sound box carrier for causing a return movement of said sound box carrier when said button is actuated, a locking lever and means operatively connecting said lever with said pawl and causing said lever to lock said toothed rod when said sound box is in the recording position.

12. In a sound recording and reproducing machine, a sound box, comprising a casing, a diaphragm within said casing, a lever connected with said diaphragm, a set screw movably mounted in said casing, and a muting element carried by an end of said set screw and adapted to engage said lever to mute the vibrations of said diaphragm.

ARNO RYSICK.